March 1, 1960 — A. M. PRENTISS — 2,926,646
FUEL INJECTION SYSTEM FOR INTERNAL COMBUSTION ENGINES
Filed Jan. 17, 1957 — 6 Sheets-Sheet 1

INVENTOR
A. M. PRENTISS

March 1, 1960  A. M. PRENTISS  2,926,646
FUEL INJECTION SYSTEM FOR INTERNAL COMBUSTION ENGINES
Filed Jan. 17, 1957  6 Sheets-Sheet 3

INVENTOR
A. M. PRENTISS

FIG_8

FIG_9

INVENTOR
A. M. PRENTISS

March 1, 1960 A. M. PRENTISS 2,926,646
FUEL INJECTION SYSTEM FOR INTERNAL COMBUSTION ENGINES
Filed Jan. 17, 1957 6 Sheets-Sheet 5

FIG.10

INVENTOR
A. M. PRENTISS

March 1, 1960  A. M. PRENTISS  2,926,646
FUEL INJECTION SYSTEM FOR INTERNAL COMBUSTION ENGINES
Filed Jan. 17, 1957  6 Sheets-Sheet 6

FIG. 11

INVENTOR
A. M. PRENTISS

United States Patent Office 2,926,646
Patented Mar. 1, 1960

2,926,646

FUEL INJECTION SYSTEM FOR INTERNAL COMBUSTION ENGINES

Augustin M. Prentiss, Hartford, Conn., assignor, by mesne assignments, to Chandler-Evans Corporation, West Hartford, Conn., a corporation of Delaware Application January 17, 1957, Serial No. 634,686

45 Claims. (Cl. 123—119)

This invention pertains to fuel injection systems for internal combustion engines of the Otto cycle type, used for propelling automotive vehicles, and more particularly has reference to such systems wherein the fuel is injected into the engine air intake manifold, or cylinder ports, under a super-atmospheric pressure, at a regulated rate which bears a selected ratio to the rate of mass air flow to the engine. Two of the principal characteristics of my novel fuel supply system, which distinguishes it from the prior art, are that the fuel flow is injected by the fuel pump which lifts the fuel from the tank to the engine, and its flow is compensated for variations in volumetric efficiency of the engine with changes in engine speed.

This application is a continuation-in-part of my application, Serial No. 437,906, filed June 21, 1954.

Internal combustion engines of the Otto cycle type draw air into their combustion cylinders by the pumping action of their pistons on their intake strokes. Therefore, the flow of air passing through the engine is equal to the product of the piston displacement in each cylinder, times the number of cylinders, times half the number of revolutions per minute, times the volumetric efficiency of the engine as an air pump. Volumetric efficiency of the engine depends upon the efficiency of the intake and exhaust valves, and the back pressure of the exhaust manifold, which are also direct functions of engine speed (r.p.m.). This being the case, it follows that for any particular engine, where the piston displacement, number of cylinders, and volumetric efficiency are known quantities, the volumetric flow of air passing through the engine is a direct, though not constant, function of engine speed (r.p.m.), since volumetric efficiency varies with engine speed in a cubic equation relationship.

For optimum power and efficiency of a piston type internal combustion engine, the fuel supply should bear a predetermined ratio by weight to the air supply; this ratio being substantially constant throughout the normal operating speed range of the engine, but somewhat higher at idling speed, and in the upper part of the speed range when maximum power is desired. The requirement of a predetermined ratio of the fuel to air supply by weight necessitates a regulation of the rate of fuel flow in accordance with the rate of mass air flow, which is equal to the volumetric flow through the engine cylinders, multiplied by the density of the entering air. The density of air entering the cylinders is that of the air in the intake manifold, which is a direction function of the absolute temperature and pressure of the air therein.

From the foregoing, it is apparent that the rate of fuel flow to an internal combustion engine should always be a direct function of the product of engine speed, volumetric efficiency, and air density in the intake manifold. Hence, a proper regulation of the rate of fuel flow to the engine, in accordance with these factors results in the attainment of a desired fuel/air ratio under all engine operating conditions.

The regulation of the rate of fuel flow in accordance with the rate of air flow to an internal combustion piston engine has heretofore generally been accomplished by means of a carburetor which, in the most successful types, comprises means for regulating the velocity of fuel flow through a fixed metering orifice in accordance with the velocity of air flow through a venturi restriction in the air passage leading to the engine intake manifold. But, since the mass air flow varies not only with its velocity but also with its density, it is at once apparent that a correct fuel/air ratio cannot be obtained under varying speeds, temperatures and other variable operating conditions, unless means are also provided for compensating the rate of air supply for variations in its density, and also for the variation of volumetric efficiency with engine speed. While special air density compensating devices have generally been incorporated in aircraft engine carburetors with more or less satisfactory results, such devices are complicated, and have not heretofore been employed in motor vehicle carburetors. Also compensation for air density alone, does not compensate for variations in volumetric efficiency with engine speed, therefore motor vehicle carburetors heretofore in use do not obtain an accurate fuel/air ratio under varying engine operating conditions.

One of the primary objects of my invention is to provide a fuel injection system for piston engines in which the rate of fuel flow to the engine is regulated simultaneously by the speed of the engine, modified for volumetric efficiency, and for the density of the air in the engine intake manifold, but the fuel flow is not motivated by the air flow, or the suction effect of the sub-atmospheric pressure, in the air intake manifold.

Another object is to provide a fuel supply system for piston engines in which the fuel is injected into the engine air intake manifold, or engine cylinder ports, by a constant delivery fuel pump whose displacement, per revolution of the engine, is proportional to half the total piston displacement per revolution of the engine, and whose fuel delivery to the engine is modified in accordance with volumetric efficiency, and the density of the air entering the engine cylinders.

Another object is to provide a simple and accurate system of supplying fuel to a piston engine, in proper proportions by weight to the combustion air flow thereto, and which does not employ any additional devices: (1) for supplying extra fuel to facilitate starting the engine; (2) for accelerating the engine; (3) for idling operation of the engine; or (4) for economizing fuel in the intermediate range of engine operation.

A further object is to provide a fuel supply system in which the fuel is raised from a fuel supply tank by the same pump that supplies the fuel injection pressure, thus eliminating the lift pumps now employed in motor vehicles.

With these and other objects which may be incident to my improvements, the invention consists of the combination and arrangement of elements hereinafter described and illustrated in the accompanying drawings, in which.

Figures 1, 2, 3, 4:
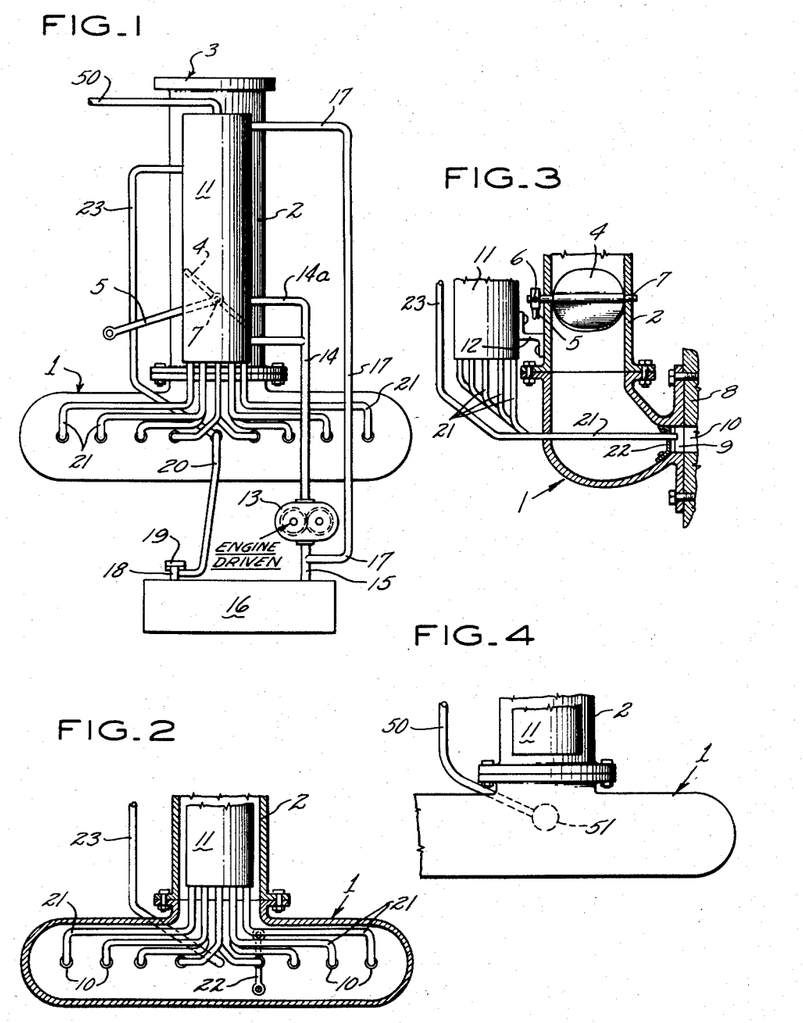
Figure 1 is an elevational view of my fuel injection system applied to an engine air intake manifold of the down-draft type.
Figure 2 is a partial vertical section through the lower portion of the system shown in Figure 1.
Figure 3 is a partial section of the lower portion of the manifold shown in Figure 1, taken on a plane at right angles with the sectional view of Figure 2.
Figure 4 is an elevational view of part of the lower portions of the manifold and regulating unit of Figure 1, used in the embodiment of the fuel flow regulating unit shown in Figure 5.

Referring first to Figures 1, 2 and 3 of the drawings, the reference numeral 1 denotes an air intake manifold of an internal combustion engine (not shown), having an air intake passage 2 in which the combustion air enters at the top 3 and flows downwardly into the manifold 1. The flow of air through passage 2 is controlled by a conventional butterfly throttle valve 4 whose position is varied by a lever 5 which is adjustably attached by a set screw 6 to the axle 7 of throttle valve 4. As shown in Figure 3, the manifold 2 is attached to a side wall 8 of the engine cylinder block so that the outlets 9 of the manifold register with the air intake valve ports 10 of the engine.

Figure 9:
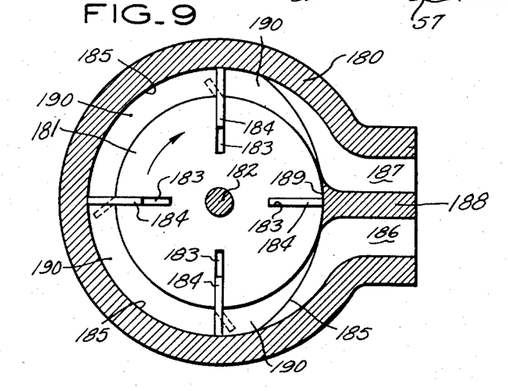
Figure 9 is a vertical section of an alternate type of fuel pump which may be employed in my improved fuel supply system.

A fuel flow regulating unit 11 is attached to the outside of air passage 2 by brackets 12 (Figure 3), and is supplied with fuel from a fuel pump 13 through connecting conduits 14 and 14a. Pump 13 is driven by the engine in constant speed relation thereto, preferably by a reduction gear (not shown), so that the rotor of the pump makes 1 revolution for each 2 revolutions of the engine. Pump 13 may be either a simple, constant-capacity, gear pump (as indicated in Figure 1), or a vane-type pump, having a variable capacity, compensated for speed, as shown in Figure 9 and further described hereinafter. Pump 13 draws fuel through a conduit 15 from a supply tank 16, and excess fuel not required by the engine is returned from regulating unit 11 to the inlet side of pump 13 by a return conduit 17. Tank 16 has a filling throat 18, whose upper end is hermetically sealed by a detachable cap 19, and a conduit 20 connects the interior of tank 16 with the interior of manifold 1, so that the pressure in tank 16 is always the same as that in said manifold.

A plurality of fuel conduits 21 connect valve ports 10 with the lower end of regulating unit 11, as shown in Figures 1, 2 and 3. The terminal end of each conduit 21 is held in fixed, centered relation to a corresponding port 10 by a spider bracket 22, one of which is shown in Figures 2 and 3. A conduit 23 connects the upper part of regulating unit 11 with the interior of manifold 1 when certain forms of regulating unit 11 are employed, as further described hereinafter.

Figure 5:
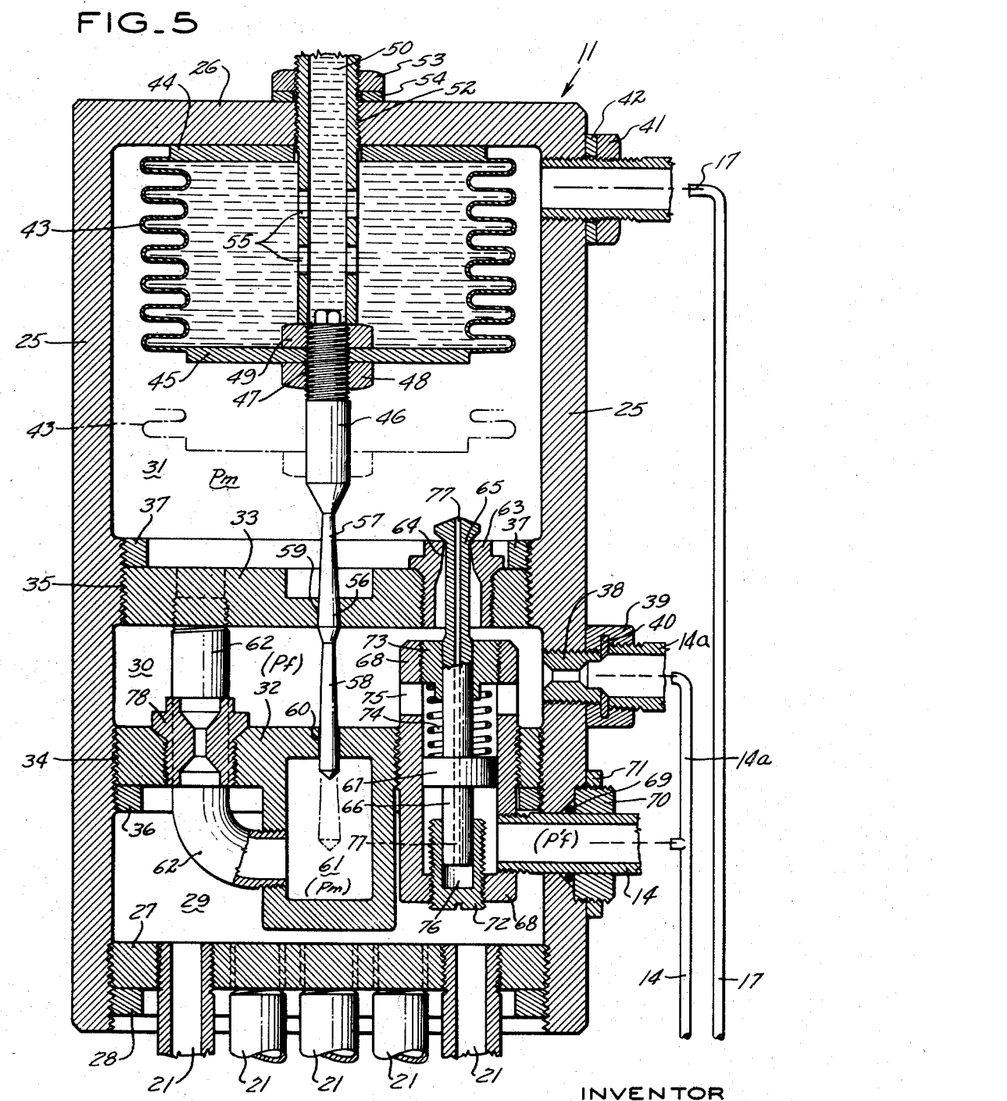
Figure 5 is an enlarged vertical section of one embodiment of the fuel flow regulating unit of the system shown in Figure 1.

Referring now to Figure 5, it will be seen that regulating unit 11 comprises a cylindrical casing 25 having an integral top wall 26 and a lower open end which is partially closed by an adjustable bottom wall 27 which is threaded into the lower end of casing 25 and secured in adjusted position by a locking ring 28. The interior of casing 25 is divided into three chambers 29, 30, and 31 by partition walls 32 and 33 which are held in adjusted positions by screw threads 34 and 35 and locking rings 36 and 37; and chamber 29 is connected to manifold 1 by fuel outlet pipes 21, as shown in Figures 1, 2 and 3. Chamber 30 is connected to conduit 14a through a fuel flow restriction 38 which is hermetically secured to said conduit by a gland nut 39 and gasket 40; and chamber 31 is connected to conduit 17 by a screw-threaded connection which is hermetically secured by a lock nut 41 and gasket 42.

Located in the upper part of chamber 31 is a Sylphon bellows 43, whose rigid top wall 44 is fixedly attached to the top wall 26 of casing 25, and whose rigid bottom wall is adjustably attached to the upper end of valve stem 46 by screw-threads 47 and locking nuts 48 and 49. The interior of bellows 43 is connected by a conduit 50 to a rigid temperature bulb 51, located in manifold 1, as shown in Figure 4. Conduit 50 is hermetically secured in an adjusted position to top wall 26 of casing 25 and top wall 44 of bellows 43 by screw-threads 52, lock nut 53 and gasket 54; and when in said position, the bottom end of conduit 50 contacts lock nut 49, so as to limit the upper travel of the bottom wall 45 of bellows 43 when said bellows is in its most contracted position, as shown in Figure 5. Conduit 50 is provided with a plurality of apertures 55 whereby fluid communication is always maintained between the interiors of bellows 43 and bulb 51, even when the lower end of said conduit is in contact with lock nut 49. It is to be understood that when the form of fuel regulator 11 shown in Figure 5 is used, conduit 23 (in Figures 1, 2 and 3) and its engaging hole in casing 25 are omitted, and the pressure ($P_m$) in manifold 1 is maintained in chamber 31 through conduit 20, tank 16, and conduits 15 and 17.

Integral with the lower end of valve stem 46 is a hydraulically balanced needle valve 56 having identical contoured parts 57 and 58, which vary the flow areas through identical fixed orifices 59 and 60, in accordance with the position of valve 58, as determined by the expansion and contraction of bellows 43. A variable portion of the fuel, which enters chamber 30 through restriction 38, passes through orifice 59 (in accordance with the position of contoured part 57 of valve 56) into chamber 31 and is returned to the inlet side of pump 13 through conduits 17 and 15. Similarly, an equal portion of the fuel entering chamber 30 through restriction 38, passes through orifice 60 (in accordance with the position of contoured part 58 of valve 56) and is also returned to the inlet side 15 of pump 13 through chamber 61, pipe 62, chamber 31, and conduits 17 and 15.

Since the same fuel pressure ($P_i$) in chamber 30 is applied to the upstream entrances of orifices 59 and 60, and the same pressure ($P_m$) exists at the downstream exits of said orifices (in chambers 31 and 61), and the flow areas through said orifices are the same, the fuel flow through each orifice is the same at all times. Also, since the contoured portions 57 and 58 of valve 56 are the same and the same pressure acting on the downstream ends of orifices 59 and 60 are the same, said valve is hydraulically balanced in all positions.

An annular bushing 63, threaded through partition wall 33, provides a fuel orifice 64, whose flow area is varied by a contoured valve 65, whereby a variable portion of the fuel entering chamber 30 through orifice 38, passes through chamber 31 and conduits 17 and 15 to the inlet side of pump 13. The lower end of valve 65 is integral with a cylindrical stem 66 to which is fixed a piston 67, slidably mounted in a cylinder 68, connected at its lower end through conduit 14 to pump 13. Conduit 14 passes through the wall of casing 25 and is secured thereto by a liquid-tight slip joint comprising an O-ring 69, gland nut 70 and a locking ring 71.

Cylinder 68 is closed at its bottom by a screw plug 72, so that the discharge pressure ($P'_t$) of pump 13 acts on the lower face of piston 67. The upper end of cylinder 68 carries a screw-threaded bushing 73 in which valve stem 66 is slidably mounted; and interposed between bushing 73 and piston 67 is a spring 74, whose compression is adjusted by said bushing, and which opposes the fuel pressure differential ($P'_f - P_f$) acting upwardly on said piston; fuel under pressure ($P_f$) downstream of restriction 38 entering the upper part of cylinder 68 through ports 75 from chamber 30. Plug 72 has a cylindrical recess 76 in which the lower end of valve stem 66 reciprocates with a liquid-tight fit. Valve 65 and stem 66 are provided with a small passage 77 through which fuel from chamber 31 enters chamber 76 and hydraulically balances valve 65. Since the same fuel pressure differential ($P_f - P_m$) is applied across orifice 64, as across orifices 59 and 60, the fuel flow through the former will always bear the same ratio to the combined fuel flows through the latter, as the ratio of the flow area of orifice 64 bears to the combined fuel flow areas through orifices 59 and 60.

Since the pressure differential ($P'_f - P_f$) across restriction 38 varies directly with the square of the speed of pump 13 (and therefore with square of engine speed), and said differential (acting on piston 67) moves valve 65 accordingly; and since the volumetric efficiency of the engine (as an air pump) also varies with engine speed, in a cubic equation relationship therewith, the contoured portion of valve 65 is shaped to regulate the fuel flowing through orifice 64, in such manner as to modify the fuel flow ($W_f$) to the engine from chamber 30, through metering orifice 78, chamber 29 and conduits 21, to compensate said flow ($W_f$) in proportion to variations in volumetric efficiency ($n_v$) of the engine as an air pump, with changes in engine speed.

Bellows 43 is completely filled with a liquid having a substantially zero coefficient thermal expansion, as for example, normal methyl aniline, or hydraulic fluid corresponding to Air Forces Specification 3580-D, Grade M, so that said bellows is insensitive to changes of temperature in chamber 31, and responds to changes in pressure ($P_m$) in said chamber. Bulb 51 (see Figure 4) and conduit 50 from bulb 51 to bellows 43 are filled with air (or nitrogen) which, having the same coefficient of thermal expansion as atmospheric air, varies in density (with changes in pressure and temperature) in the same manner as the latter, and expands or contracts bellows 43, in proportion to changes in temperature of the air in manifold 1. At the same time, bellows 43 also responds proportionally to changes in the pressure ($P_m$) of the air in manifold 1, since the fuel pressure ($P_m$), acting externally on bellows 43, is the same as the pressure ($P_m$) of the air in manifold 1. Since the density of the air entering the engine from manifold 1 varies directly with the pressure ($P_m$) in said manifold, and inversely with the temperature ($T_m$) of said air, it follows that bellows 43 expands and contracts in proportion to changes in density of the air in manifold 1, and moves valve 56 accordingly.

In connection with the foregoing, it is to be particularly noted: first, that the same fuel pressure differential ($P_f - P_m$) is applied across all three by-pass orifices 59, 60 and 64, hence the relative fuel flows through these orifices will always be proportional to their relative flow areas; secondly, the combined flow area through orifices 59 and 60 is varied by valve 56 and bellows 43 in proportion to the density (i.e. pressure $P_m$ and temperature $T_m$) of the air entering the engine from manifold 1; and thirdly, the flow area through orifice 64 is varied by valve 65 in proportion to variations in volumetric efficiency ($n_v$) of the engine as an air pump, with changes in engine speed.

Since the fuel flow ($W_f$) to the engine through metering orifice 78 is equal to the fuel pump output ($W_p$), per unit of time, minus the fuel by-passed back to the inlet side of pump 13, through orifices 59, 60 and 64, and the flow ($W_b$) of said by-passed fuel is regulated in accordance with variations in the density of the air entering the engine from manifold 1, and the volumetric efficiency ($n_v$) of the engine as an air pump, the fuel flow to the engine ($W_f$) is also so regulated. Accordingly, if the fuel pump output per revolution of the engine bears any desired fixed relation (e.g. 10%) to half the total piston displacement per revolution of the engine, the rate of fuel flow ($W_f$) to the engine will always bear the same weight relation (e.g. 10%) to the rate of air flow, at all engine speeds, regardless of variation in density of the combustion air and volumetric efficiency ($n_v$) of the engine as an air pump, with changes in engine speed. This being the case, it is clear that any desired mixture ratio, throughout the range of engine operation, can be obtained by suitably contouring valves 56 and 65, as will be further more particularly described hereinbelow.

Figure 6:
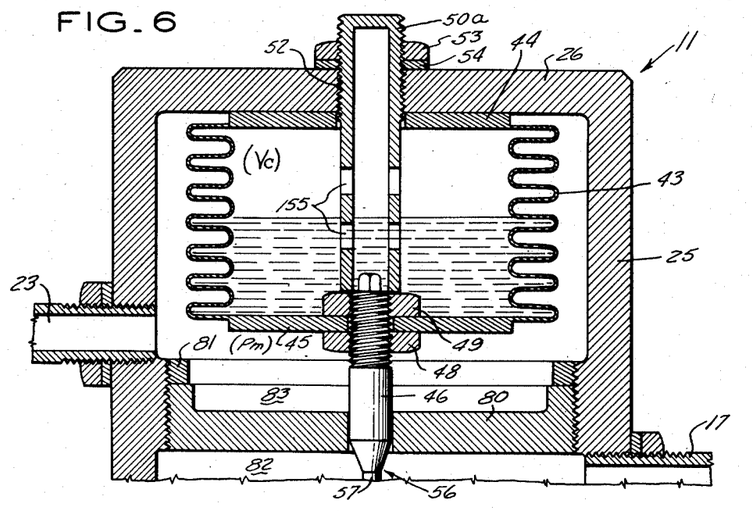
Figure 6 is a vertical section of the upper part of a modified form of the fuel flow regulating unit shown in Figure 5.

In the modified form of fuel regulating unit 11 shown in Figure 6, those elements which are the same as in Figure 5, are denoted by the same reference numerals. The principal differences between the two forms of fuel regulating unit 11 shown in Figures 5 and 6, are in the means for operating the main valve 56. In the arrangement illustrated in Figure 6, the thermal bulb 51 and conduit 50 (see Figures 1 and 4) are both omitted, and there is substituted for that part of said conduit which extends into casing 25, a hollow tubular member 50a, closed at its upper end by an integral top wall, and having a plurality of ports 155. Member 50a is hermetically secured in adjusted position by screw-threads 52, extending through the top wall 26 of casing 25 and the top wall 44 of bellows 43, and by lock-nut 53 and gasket 54. When in its adjusted position, as shown in Figure 6, member 50a contacts lock nut 49 when bellows 43 is in its most contracted position, and thus limits the upward travel of the bottom wall 45 of said bellows and main valve 56.

The lower part of bellows 43 is filled with the same temperature insensitive liquid as in Figure 5, but the upper part of the bellows is filled with air at atmospheric pressure. The volume of air ($V_c$) in bellows 43 is such that, at a selected minimum engine operating temperature of, say 440° F. (absolute), and at atmospheric pressure ($P_a$) of 14.70 p.s.i., the bellows will be at its free height and exert no downward force on valve 56. At this time the bellows is also at its minimum contraction and valve 56 is in its uppermost (closed) position, as shown in Figure 6.

In the arrangement shown in Figure 6, an additional partition wall 80, screw-threaded into casing 25 and held in adjusted position by a lock ring 81, divides chamber 31 (of Figure 5) into two chambers 82 and 83, of which the former serves to return by-passed fuel from orifices 59, 60 and 64 to 17, and the latter serves as an external pressure chamber for bellows 43. Chamber 83 is connected to manifold 1 by conduit 23, as shown in Figures 1, 2 and 3, the pressure ($P_m$) of the air in said manifold thus transmitted to chamber 83 acts externally on bellows 43. With this arrangement, the pressure ($P_m$) in chamber 83 varies from a maximum of substantially atmospheric pressure ($P_a$), when the engine is operating at its lowest speed with throttle 4 wide open, to a minimum of approximately 5 to 6 p.s.i. absolute, when the engine is operating at its highest speed, with throttle 4 at its minimum opening (e.g. when a motor vehicle is running down hill at a speed which exceeds the normal speed of the engine at that time).

As the pressure ($P_m$) in chamber 83 falls below its maximum value (14.70 p.s.i.), the air in bellows 43, at a higher pressure ($P_1$), forms with pressure ($P_m$) a differential ($P_1 - P_m$) which acts on movable wall 45 and expands bellows 43, in proportion to the value of said differential. The position of the bellows 43 (and valve 56) is thus responsive to the value of the manifold air pressure ($P_m$) at all times.

In addition to the foregoing, the manifold air entering chamber 83 will cause the temperature of the air surrounding bellows 43 to rise and fall as the temperature ($T_m$) of the air in manifold 1 rises and falls. The effect of such a rise in temperature is to expand the air in bellows 43 in proportion to the magnitude of said rise, and vice versa, when the manifold air temperature falls. Thus, bellows 43 is responsive to changes in the temperature ($T_m$) of the air in manifold 1, in addition to its response to changes in manifold air pressure, as described above. Accordingly, since bellows 43 is simultaneously responsive to both pressure and temperature of the manifold air, its position corresponds to the density of said air, and therefore the fuel flow through valve 56 is regulated in accordance with the density of the air entering the engine.

Also, in the arrangement shown in Figure 6, since volumetric valve 65 functions in the same manner as previously described for Figure 5, it will be seen that the fuel regulator 11 of Figure 6 regulates the fuel flow to the engine, in accordance with the density of the combustion air and the volumetric efficiency of the engine as an air pump, in the same manner as described above for the arrangement shown in Figure 5.

In order to avoid loss of heat while the manifold air is in conduit 23, said conduit may be composed of some heat insulating material, or such material may be applied as a wrapping over the conduit.

One advantage of the arrangement shown in Figure 5, over that of Figure 6, is a somewhat more precise response of bellows 43 and valve 56 to temperature changes of the air in manifold 1, since in Figure 5, the bellows responds directly to such temperature changes, whereas in Figure 6, bellows 43 responds to the temperature of the air in chamber 83. However, since casing 25 of fuel regulator 11 is made of light metal (e.g. aluminum), it readily transmits heat from the air surrounding the engine to the air in chamber 31 which, in addition to the heat transmitted to chamber 31 by conduction from its attachment to the engine, causes the temperature of the air in said chamber to closely approximate the temperature of air surrounding the engine at all times. And since the air surrounding the engine of a motor vehicle is not subject to rapid changes of temperature, the overall results obtained by the arrangement in Figure 6 is substantially the same as for the arrangement of Figure 5.

Figure 7:
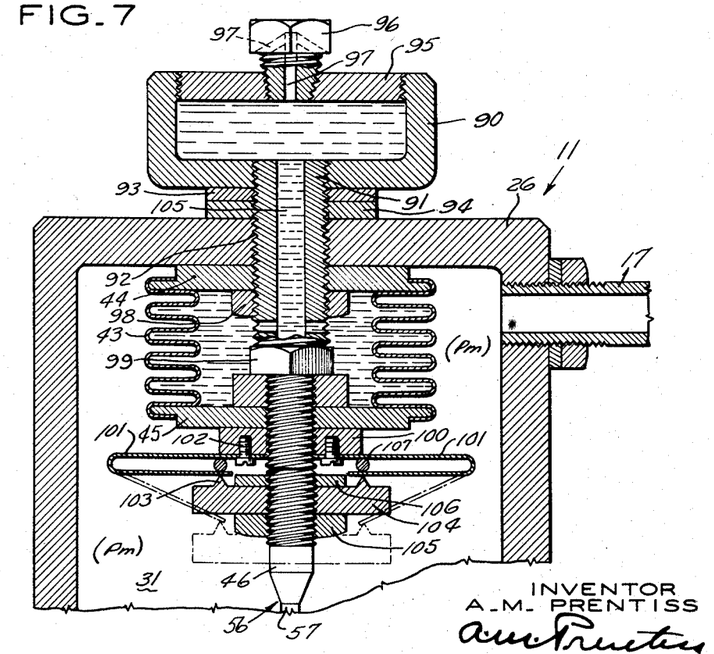
Figure 7 is a vertical section of the upper part of another modification of the fuel flow regulating unit shown in Figure 5.

The modification shown in Figure 7, differs from the construction in Figure 5, only in the arrangement of elements above the contoured portion 57 of valve 56 and the same reference numerals denote the same parts that appear in Figure 5.

In lieu of thermal bulb 51 and conduit 50 of Figures 4 and 5, in Figure 7 a liquid reservoir 90 is hermetically secured to the top wall 26 of casing 25 by a tube 91 having external threads 92 which are engaged by wall 26, a gasket 93 and lock nut 94. The top of reservoir 90 is closed by a threaded disc cover 95 which carries a threaded filling plug 96, having passages 97 to vent the reservoir to the outside atmosphere. Tube 91 is also threaded through the top wall 44 of bellows 43 and is hermetically secured in an adjustable relation to said bellows by a lock nut 98. When in adjusted position, the lower end of tube 91 contacts the upper end of a bolt 99, secured to the bottom wall 45 of bellows 43, to limit the upward travel of said wall, with reference to the upper wall 44 of bellows 43, when said bellows is in its most contracted position, as shown in Figure 7. Reservoir 90 is filled up to the level of the lower end of plug 96 by the same temperature insensitive liquid mentioned in the last paragraph on page 9. This liquid also completely fills tube 91 and bellows 43 even when the latter is in its most expanded position; hence, bellows is not affected by the temperature of the fuel in chamber 31.

A fibre disc 100, fixedly attached to the lower wall 45 of bellows 43, carries a pair of bimetallic, thermal responsive elements 101 which are secured at their upper ends by screws 102 to disc 100. The lower free ends of elements 101 slidably contact lugs 103 on an annular plate 104 which is adjustably secured to the upper end of valve stem 46 by lock nuts 105 and 106, and when in its adjusted position, the upper end of stem 46 contacts the lower end of bolt 99, so as to limit the upper travel of said stem (and valve 56), with reference to the bottom wall 45 of bellows 43, when the free ends of elements 101 are in their uppermost (retracted) position, as shown in Figure 7. A plurality of clips 107, attached to plate 104, slidably contact the upper surfaces of elements 101 opposite lugs 103, and serve to raise said plate and valve stem 46 when the free ends of elements 101 are above their lowest (extended) position, as in Figure 7.

When the temperature of the fuel in chamber 31 is at its lowest value (e.g., 440° F., absolute), the free lower arms of elements 101 are in their uppermost (retracted) positions, as shown by full lines in Figure 7; and when said temperature is at its highest value (e.g., 710° F., absolute), the free ends of elements 101 are in their lowest positions, as shown by phantom lines in Figure 7. It will be seen that elements 101 vary the position of valve stem 46 (and valve 56) in accordance with the temperature of the fuel in chamber 31; and this movement of said valve is in addition to that caused by the expansion and contraction of bellows 43, by the pressure differential ($P_a - P_m$) acting downwardly on the bottom wall 45 of said bellows. Accordingly, valve stem 46 (and valve 56) are positioned by elements 101 and bellows 43 in accordance with the temperature and pressure in chamber 31 which are substantially the same as the pressure ($P_m$) and temperature ($T_m$) of the air entering the engine from manifold 1.

With the foregoing arrangement of Figure 7, it is to be particularly noted: first, that a substantially constant, atmospheric pressure ($P_a$) is maintained at all times on the inside of bellows 43, while the manifold air pressure on the fuel in chamber 31, acting on the outside of said bellows, may vary in value from a maximum of substantially atmospheric pressure ($P_a$), to a minimum of from 5 to 6 p.s.i., as in the arrangements shown in Figures 5 and 6; however, the pressure differential ($P_a - P_m$), acting on bellows 43, is always proportional to the pressure ($P_m$) of the air entering the engine from manifold 1; secondly, since bellows 43 is always completely filled with temperature insensitive liquid, changes in temperature ($T_m$) of the fuel in chamber 31 has no effect upon the expansion and contraction of said bellows; thirdly, since the free ends of thermal-responsive elements 101 move valve stem 46 downwardly, from its uppermost position at lowest temperature (e.g. 440° F. absolute), in proportion to the rise in temperature ($T_m$) of the fuel in chamber 31 above said value (440° F.) (and vice versa), and said movement is in addition to the expansion of the bellows, with decrease in manifold pressure ($P_m$), the movement of valve 56 is proportional to changes in manifold temperature ($T_m$) and pressure ($P_m$); hence the fuel flow ($W_f$) to the engine is regulated by valve 56 in accordance with the density of the air entering the engine from manifold 1, as described hereinabove in the arrangements in Figure 6.

It will, of course, be understood that the modification shown in Figure 7, includes volumetric valve 65 which functions in the same manner as previously described in the arrangements shown in Figures 5 and 6.

Figure 8:
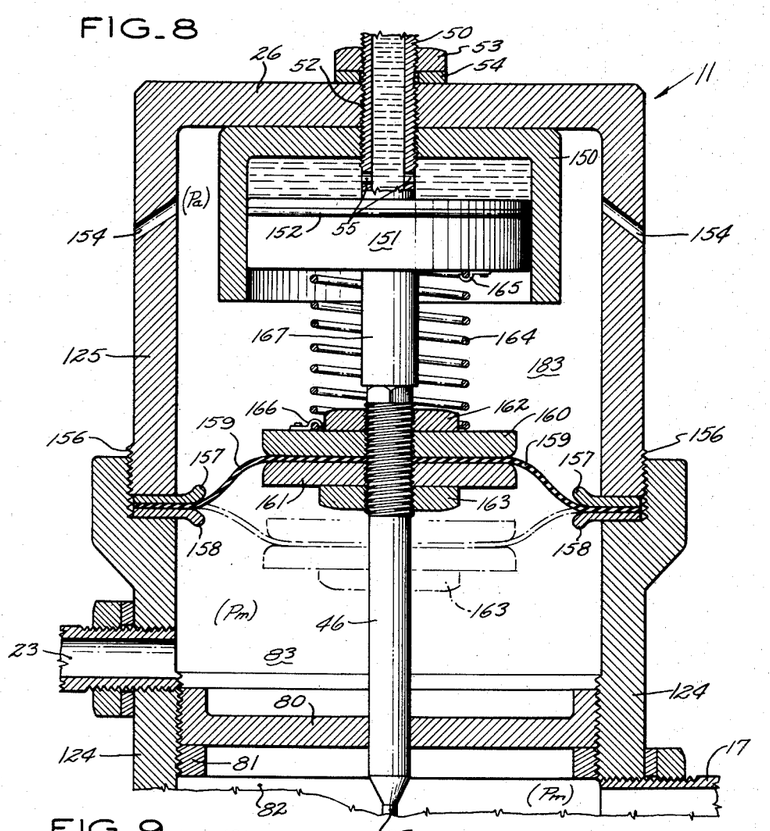
Figure 8 is a vertical section of the upper part of another modification of the fuel flow regulating unit shown in Figure 5.

The modification of fuel regulator 11, shown in Figure 8, differs from the construction in Figure 6 only in the arrangement of elements above partition wall 80, and the same reference numerals denote the same parts that appear in Figure 6.

In Figure 8, conduit 50 connects thermal bulb 51 with the interior of casing 25 (as in Figure 5) but in Figure 8 a cylinder 150 containing a piston 151 are substituted for bellows 43 of Figure 5. Cylinder 150 is fixed to the top wall 26 of casing 25, and the lower end of conduit 50 is hermetically secured in adjusted position by threads 52, lock nut 53, and gasket 54. When in its adjusted position, the bottom end of conduit 50 contacts the top of piston 151 and limits its upward travel when the fluid in thermal bulb 51 is at its lowest temperature (e.g. 440° F., absolute). Instead of containing air as in Figure 5, bulb 51 in Figure 8 is completely filled with a liquid having a high and substantially constant coefficient of thermal expansion, such as for example, para-cymene. This liquid also completely fills conduit 50 and the interior of cylinder 150 in all pistons or piston 151. An O-ring 152 in piston 151, insures a fluid-tight but free running seal between said piston and cylinder 150.

In the construction depicted in Figure 8, casing 25 (of Figure 5) is divided into two parts, of which the upper part 125 corresponds to the upper part of casing 25 in Figure 5, except that in Figure 8 a plurality of passages 154 vent the interior of casing 125 (i.e., chamber 183) to the outside atmosphere, and fuel conduit 17 is connected to the lower part 124 of the casing, below partition wall 80, as in Figure 6. Parts 124 and 125 of the casing in Figure 8 are secured together by screw-threads 156 and the adjacent ends of said parts clamp in position a pair of supporting rings 157 and 158, which embrace the outer portion of a flexible diaphragm 159, and hermetically seal the joint therebetween. The inner portion of diaphragm 159 is attached to the upper end of valve stem 46 by a pair of annular plates 160 and 161, which are threaded on said stem and secured in adjusted position by lock nuts 162 and 163.

A tension spring 164 is attached to piston 151 and plate 160 by clips 165 and 166, and opposes the pressure differential $(P_a - P_m)$ which acts downwardly upon diaphragm 159 whenever the pressure $(P_m)$ in chamber 83 is less than the atmospheric pressure $(P_a)$ in chamber 183, which condition obtains whenever the engine is in operation.

The downward travel of diaphragm 159, in response to decrease in the value of the manifold air pressure $(P_m)$ in chamber 83, moves valve stem 46 and valve 56, in accordance with the value of said pressure $(P_m)$ at all times.

Piston 151 carries an integral depending rod 167 which contacts the upper end of valve stem 46 when said stem is in its uppermost position and thus limits the upward travel of valve 56, in accordance with the position of piston 151. The downward movement of piston 151, in response to a rise in temperature $(T_m)$ of the liquid in bulb 51, is transmitted to valve stem 46 and valve 56, by rod 167 whenever said rod is in contact with valve stem 46, and when not in said contact, said movement varies the tension in spring 164.

Accordingly, valve 56 is positioned to regulate the by-pass fuel flow through orifices 59 and 60, in accordance with variations in said pressure $(P_m)$ and temperature $(T_m)$, and therefore the density of the air entering the engine from manifold 1. And since valve 65 also simultaneously regulates the by-pass fuel flow through orifice 64, in accordance with variations in the volumetric efficiency of the engine as an air pump, with changes in engine speed, as previously described for Figure 5, the total by-pass fuel flow $(W_b)$, and therefore the fuel flow $(W_f)$ to the engine, are regulated in accordance with said density and volumetric efficiency, as in Figure 5.

The functioning and results obtained by the construction shown in Figure 8 are substantially the same as for that of Figure 7. The principal differences between the constructions shown in Figures 7 and 8 are the substitution in Figure 8 of an hydraulically actuated temperature responsive piston (151) for the bimetallic strips 101 of Figure 7, as the temperature responsive actuating means of Figure 8. Also in Figure 8, the temperature responsive means responds directly to the temperature $(T_m)$ of the air in manifold 1, whereas in Figure 7, the bimetallic strips 101 respond to the temperature of the fuel in chamber 31.

The modification shown in Figure 8, includes volumetric valve 65 which functions in the same manner as described in the arrangements shown in Figures 5 and 6.

It will be noted that in all four forms of fuel regulator 11, as shown in Figures 5, 6, 7 and 8, metering orifice 78 extends to an appreciable height above partition wall 32, which serves to retain in chamber 30 a residual pool of fuel whenever the engine stops operating. Although valve 56 does not completely close orifices 59 and 60 when the engine stops operating (unless the temperature $(T_m)$ is at its minimum value (440° F.)), chamber 61 and pipe 62 (up to the level of the top of orifice 78) will remain filled with fuel, so that when the engine is started up, the first fuel entering chamber 30 from conduit 14a immediately overflows over the top of orifice 78, before chamber 30 begins to fill with fuel. Since no fuel is by-passed until chamber 30 is filled with fuel, the full capacity of the fuel pump 13 is effective to deliver fuel to the engine at the instant of starting. Also, at the same time, since throttle 4 is in a nearly closed position when the engine is started, a strong suction occurs in manifold 1 which quickly expands bellows 43 and the resulting downward plunge of valve 56 displaces additional fuel from chamber 61 which augments the overflow from chamber 30 into orifice 78.

Again, the starting of the engine causes an upward movement of piston 67 which displaces fuel from cylinder 68 (above piston 67) and adds to the overflow from chamber 30 through orifice 78. The effect of the foregoing is to deliver to the engine, upon starting, a charge of excess fuel which functions as a priming charge to facilitate starting the engine. It will be further noted that the amount of fuel displaced by the sudden descent of valve 56 into chamber 61 will be varied by the initial position of valve 56 when the engine is started, and this in turn depends upon the temperature $(T_m)$ in chamber 31. Thus, the higher the temperature $(T_m)$ in chamber 31, the lower will be said initial position of valve 56, and a correspondingly less amount of fuel will be displaced upon starting the engine, and vice versa; hence the priming charge will vary inversely with the manifold temperature $(T_m)$. Accordingly, no special devices, such as the choke apparatus required for starting the engine when a carburetor is employed, is necessary with my novel fuel regulator.

Whenever the air throttle is quickly opened to accelerate the engine, the manifold pressure suddenly rises. In carburetors now in use, where the fuel flow is caused by a differential air pressure across a venturi in the air passage, or by the suction effect of the sub-atmospheric pressure in the air intake manifold, the sudden increase in manifold pressure, attendant upon the quick opening of the throttle, results in a deficiency of the fuel flow during acceleration of the engine, just when an enriched fuel/air mixture is required for maximum power output of the engine. In order to overcome this deficiency in carburetors, resort has been had to various forms of acceleration pumps, in order to supply the additional fuel required during acceleration. These pumps add to the complication and expense of the carburetor and have the further disadvantage of loss in effectiveness owing to wear of the moving parts.

In my improved fuel injection system, no additional acceleration pumps or other devices are needed to supply the proper increased flow of fuel during acceleration of the engine, because the rapid rise in manifold pressure in chamber 31 (attendant upon sudden opening of throttle 4) immediately moves valve 56 toward closed position. This sudden reduction in the flow area of orifices 59 and 60 not only causes a corresponding rapid reduction in the escape of fuel from chamber 30 back through return conduit 17, but also a proportionally rapid rise in pressure in chamber 30 which forces additional fuel to flow through orifice 78 to the engine during the acceleration period.

Conversely, a sudden closing of the throttle 4 causes a rapid decrease in the manifold pressure in chamber 31 which quickly lowers valve 56 and opens orifices 59 and 60. This not only permits a temporary increase in the escape of fluid from chamber 30 through conduit 17, but also a corresponding reduction in the fuel pressure in said chamber, both of which result in a temporary decrease in the fuel flow to the engine through orifice 78 during the period of deceleration. Thus, the fuel/air mixture ratio is decreased during deceleration, when no power is required from the engine, with a corresponding economy of fuel.

Over and above the elimination of additional devices required by prior art carburetors to furnish extra fuel to facilitate starting of the engine and for acceleration, my improved fuel system has the further advantage of not employing any additional fuel feeding system or device for idling operation of the engine that are required by prior art carburetors.

According to my invention, the fuel is injected into the air intake manifold or engine cylinders, by a positive displacement pump of constant capacity, which is driven by the engine in a fixed speed ratio thereto. Basically, the fuel displacement, per revolution, of the pump, is set or adjusted to bear a selected ratio by weight to the air displacement, per revolution, of the engine, when the air flowing into the engine cylinders is at normal, sea level density (.07651 pound per cubic foot). This density is substantially the maximum which the air entering the engine can attain, when the engine is running at its lowest speed (idling), with the throttle 4 wide open. As the throttle 4 is closed, the density of the air entering the engine from the air intake manifold 1 is progressively decreased, even when the engine is running at constant speed. Said density also progressively decreases as the speed of the engine increases, when the throttle 4 is in any given position (i.e., degree of opening remains constant). Accordingly, said density varies inversely with degree of throttle opening and engine speed, and reaches its minimum value at the highest engine speed attainable with the throttle substantially closed, i.e., when the vehicle is traveling at its maximum overrun speed.

Accordingly, in my invention, of the fuel displaced per revolution of the pump, the percentage that is delivered to the engine is regulated in proportion to the density of the air entering the engine from intake manifold 1. Since the density of the air in manifold 1 varies, directly with its pressure, and inversely with its temperature, the percentage of the fuel output, per revolution, of the pump that is delivered to the engine is determined by the degree of opening of valve 56, which is controlled by the pressure of the air in manifold 1.

Since the volume of air that is displaced by the engine pistons, per revolution of the engine, varies directly with the volumetric efficiency of the engine as an air pump, it is necessary to also vary the fuel flow to the engine directly with the variation of its volumetric efficiency. As volumetric efficiency varies inversely with engine speed, in a cubic equation relationship, the necessary modification of the fuel flow to the engine to compensate for variations in volumetric efficiency is accomplished by suitably contouring valve 65, whose lift is proportional to the square to engine speed.

Finally, while the optimum fuel/air mixture ratio is substantially constant throughout the greater part of the speed range of the engine, said ratio must be increased both at very low speed (idling) and near maximum speed, when the engine is delivering its highest power output. The variation in fuel flow to the engine, required to produce the desired enrichment of the fuel/air mixture near minimum and maximum engine speed, is also obtained by suitably contouring valve 56, near the lower end of its contoured portions 57 and 58. The contouring of valve 56 thus accomplishes the usual function of a separate idle fuel flow system or device, as well as the usual function of an economizer or similar device, used in present day carburetors, thus obviating the necessity of providing special and additional devices for these purposes.

The manner in which the several forms of my fuel flow regulator 11, as shown in Figures 5, 6, 7 and 8, accomplish the desired regulation of the fuel flow under the above-mentioned engine operating conditions, will be further described hereinafter in connection with the operation of my invention.

Since the output of a constant capacity fuel pump, such as the gear pump 13 (Figure 1), varies substantially in straight linear ratio to its speed, while the air flow through the engine progressively decreases from a straight linear ratio to its speed, as said speed increases, it follows that a progressively increasing percentage of the fuel output of pump 13 is recirculated around the pump, through return conduit 17, as the engine (and pump) speed increases. (See discussion hereinbelow of the chart in Figure 10.) In order to reduce the percentage of fuel recirculated around the fuel pump, as its speed increases, a special kind of variable capacity pump, wherein the output progressively decreases from a straight linear ratio to its speed, as said speed increases, may be employed (in lieu of gear pump 13) as the fuel pump in my improved fuel injection system. Such a pump is illustrated in Figure 9 and consists of a simple vane pump, in which provision is made to decrease volumetric efficiency with increasing speed, so that the pump output varies with its speed in the same manner as the air flow to the engine varies with engine speed.

In Figure 9, the reference numeral 180 denotes the body of the pump, in which is mounted a rotor 181 upon a shaft 182 journalled in the side walls of body 180. Rotor 181 is provided with a plurality of radial slots 183 in which are slidably mounted an equal number of vanes that extend radially outward from slots 183 to the circular surface 185 of the body 180. Upon rotation of rotor 180, as indicated by the arrow, the centrifugal force acting on vanes 184 urges them radially outward from slots 183 and tends to keep the outer edges of the vanes in contact with the circular inner surface 185 of the body 180. Liquid is drawn into body 180 through an entrance passage 186 and is discharged through an outlet passage 187 which is separated from inlet 186 by a partition wall 188. The space between the inner surface 185 of body 180 and the outer surface of rotor 181 defines a generally annular passage 190 which is constricted in width in the vicinity of partition wall 188. Inlet and outlet ports (not shown) connect passage 190 with passages 186 and 187, respectively. It will be understood that when the pump shown in Figure 9 is substituted for the gear pump 13 of Figure 1, conduit 15 is connected to pump inlet 186 and conduit 14 to pump outlet 187.

The pump of Figure 9, as so far described, is a conventional, constant capacity pump in which the output is a straight linear function of the rotor speed. In order to progressively reduce the pump output below a straight linear ratio with its speed, as said speed increases, the vanes 184 are made of resilient metal, so that they bend slightly in proportion to the fluid pressure differential in passage 190 which acts on the free ends of said vanes, as shown in dotted lines in Figure 9. Since the pressure differential in passage 190 progressively increases from the region of inlet 186 to the region of outlet 187, vanes 184 are increasingly deflected as they move from the former to the latter region. In order to facilitate this deflection, the trailing outer edge of each slot 183 is slightly chamfered, as indicated at 189.

Since the pressure differential in passage 190, acting on vanes 184 increases in proportion to the speed of rotor 181, the deflection of vanes 184 will correspondingly increase with rotor speed. This deflection permits the liquid in each sector of passage 190, between adjacent vanes 184, to escape, in a counter-rotational direction, into the adjacent sector, and thus reduces the output of the pump in proportion to the deflection of vanes 184. Accordingly, the output of the pump progressively decreases below a straight linear ratio with rotor speed, as said speed increases, as will be more particularly described hereinafter.

Other types of rotary pumps, having a similar variation of output delivery, could obviously be employed, in lieu of the pump shown in Figure 9, as for example, a gear pump, having one or both side walls movable, and arranged to increase the space between said walls and the adjacent sides of the gears, as the pump discharge pressure increases with increasing pump speed.

Another obvious modification of my improved fuel supply system is the substitution, for conduits 21 which conduct fuel from chamber 29 to each air inlet port 10 (see Figures 1, 2 and 3), of a single conduit connecting chamber 29 with manifold 1, whereby the fuel would be injected into a central point in manifold 1, instead of at the entrance of each port 10, as shown in Figure 3. However, since the use of conduits 21 gives a far more even distribution of fuel to all the engine cylinders and prevents the fuel from wetting the inside walls of manifold 1, it is the preferred embodiment of my invention.

Another modification of my improved fuel supply system that could readily be made, is the omission of conduit 20 connecting manifold 1 with fuel supply tank 16 (Figure 1), and venting said tank to atmosphere, instead of hermetically sealing it with air-tight closure 19. This would then place the fuel in tank 16 under atmospheric pressure instead of manifold pressure, as in Figure 1. The principal disadvantage of this modified arrangement is that it requires the use of a much smaller fuel metering orifice than that shown at 59 and 60 in Figure 5, with resulting large increase in fuel pump discharge pressure, especially at higher engine speeds. Because of this disadvantage and the greater simplicity of the arrangement shown in Figure 1, the latter is the preferred embodiment of my invention.

Still other modifications of my invention, such as the following, can obviously be made. Thus, in the embodiments shown in Figures 5 and 7, the pressure ($P_m$) in chamber 31 can be maintained by the air pressure in manifold 1, instead of utilizing the by-pass fuel to maintain said pressure. To effect this change, it is only necessary to substitute for the connection of conduit 17 to chamber 31 (shown in Figures 5 and 7), the arrangement shown in Figure 6, wherein the additional partition wall 80 is employed, and conduit 17 is connected to chamber 82, and conduit 23 to chamber 83.

OPERATION

The principles of operation of my improved fuel supply system can best be described in terms of certain mathematical relations between its component elements, and accordingly, the following symbols will be used to denote the indicated entities.

(p.s.i.=pounds per square inch)
(p.s.f.=pounds per square foot)
(p.c.f.=pounds per cubic foot)
(p./s.=pounds per second)
(p./m.=pounds per minute)

$W_a$=rate of mass air flow to engine (p./s.).
$W_f$=rate of fuel flow to engine (p./s.).
$C$=air/fuel mixture ratio ($W_f/W_a$).

$P_a$=atmospheric pressure, p.s.f.; 2116.8 p.s.f. (=14.70 p.s.i.).
$P_m$=air intake manifold pressure (p.s.f.).
$\gamma_a$=atmospheric density (.07651 p.c.f.), at 14.70 p.s.i. and 519° F. abs.
$\gamma_m$=manifold air density (p.c.f.), at $P_m$ and $T_m$.
$N$=engine speed, revolutions per minute (r.p.m.); e.g., maximum N= 3800.
$D$=displacement of engine pistons (cu. ft.); e.g., 331 cu. ins.=.19155 cu. ft.
$s$=air-suction cycle of engine (=2 for 4 cycle engine).
$T_a$=temperature (absolute) of ambient atmosphere in ° F.
$n_v$=volumetric efficiency of engine as an air pump; e.g., 70% to 90%.
$d$=displacement of fuel pump, in lbs. per engine revolution; e.g., .000671.
$W_p$=pump output; e.g., 2.55 P./m. (maximum).
$W_b$=by-passed fuel flow, P./m.
$\left.\begin{array}{l}P_a\\P_m\end{array}\right\}$=fuel pressure=$P_a$ and $P_m$, p.s.f.
$C_a$=coefficient of air flow.
$C_f$=coefficient of fuel flow.
$A_n$=flow area of fuel metering orifice 78 (sq. ft.).
$A_b$=flow area of by-pass valve orifices 59 and 60 (sq. ft.).
$A_c$=flow area of by-pass valve orifice 64 (sq. ft.).

The air flow to the engine may be expressed in terms of engine characteristics, as follows:

$$W_a = n_v \cdot N \cdot D/s \cdot \gamma_m \qquad (1)$$

$$\gamma_m = \gamma_a \left(\frac{P_m}{P_a}\right)^{.71} \qquad (2)$$

(Law of adiabatic expansion of gases)

$$\gamma_a = \gamma_o \left(\frac{T_o}{T_a} \frac{P_a}{P_o}\right) \qquad (3)$$

(Law of adiabatic expansion of gases)

Where $\gamma_o$ is the density (.07651 p.c.f.) of air at standard temperature $T_o$=519°, and sea level pressure, $P_o$=14.70 p.s.i. Substituting the value of $\gamma_a$ from (3) in (2)

$$\gamma_m = \gamma_o \left(\frac{T_o}{T_a} \frac{P_a}{P_o}\right)\left(\frac{P_m}{P_a}\right)^{.71} \qquad (4)$$

Since $P_a$=$P_o$=14.70 p.s.i., and $\gamma_o$ and $T_o$ are constants, $\gamma_o \cdot T_o$ is a constant $K$ (=39.71).

Let $$\left(\frac{P_m}{P_a}\right)$$

be designed by $X$; then Equation 4 becomes $$\gamma_m = \left(\frac{K}{T_a}\right) X^{.71} \qquad (5)$$

Substituting the value of $\gamma_m$ from (5) in (1)

$$W_a = n_v N \cdot D/s \left(\frac{K}{T_a}\right) X^{.71} \qquad (6)$$

For any given engine $D/s$ is a constant, say $K_1$, and let $K \times K_1 = K_2$, then $$W_a = \frac{K_2 n_v N}{T_a} X^{.71} \qquad (7)$$

Considering by-pass valve orifices 59 and 60 alone (i.e., assuming 64 is closed by valve 65), the fuel flow to the engine may be expressed as follows:

$$W_f = W_p - W_b \qquad (8)$$

but $$W_p = dN \qquad (9)$$

and $$C = W_f / W_a \qquad (10)$$

therefore $$C = (W_p - W_b)/W_a \qquad (11)$$

When fuel tank 16 is arranged as in Figure 1, the flow through orifices 59 and 60 is expressed by:

$$W_b = C_f A_b \sqrt{(P_f - P_m) \cdot (2g/\gamma_f)} \qquad (12)$$

and the fuel flow to the engine is expressed by:

$$W_f = C_f A_n \sqrt{(P_f - P_m) \cdot (2g/\gamma_f)} \qquad (13)$$

Dividing Equation 12 by Equation 13, we have:

$$W_b / W_f = A_b / A_n \qquad (14)$$

that is, since $W_b$ and $W_f$ in Equations 12 and 13 are caused by the same pressure differential $\sqrt{P_f - P_m}$, the flows $W_b$ and $W_f$ are proportional to the ratio of the flow areas $A_b$ (orifices 59 and 60) and $A_n$ (orifice 78).

From Equation 14

$$A_b = A_n \left( \frac{W_b}{W_f} \right)$$

and from Equation 8

$$W_b = W_p - W_f$$

$$A_b = A_n \left( \frac{W_p - W_f}{W_f} \right)$$

or $$A_b = A_n \left( \frac{W_p}{W_f} - 1 \right) \qquad (15)$$

Substituting the value of $W_p$ from Equation 9 and the value of $W_f$ from Equation 10 in Equation 15

$$A_b = A_n \left( \frac{dN}{CW_a} - 1 \right) \qquad (16)$$

substituting the value of $W_a$ from Equation 7 in Equation 16 and cancelling out (N)

$$A_b = A_n \left( \frac{dT_a}{CK_2 n_v X^{.71}} - 1 \right) \qquad (17)$$

From Equation 17, it may be seen that the opening of valve 56 (i.e., value of $A_b$) is independent of engine speed (N), and varies in linear proportion directly with fuel pump displacement per r.p.m., atmospheric temperature ($T_a$), and inversely with the mixture ratio (C), volumetric efficiency ($n_v$) the expansion ratio $X = (P_m/P_a)$.

The rate of mass air flow ($W_a$) through the air passage (2) is expressed by the following equation:

$$W_a = Q_m \gamma_m = F_m \sqrt{6.88 \cdot 32.2 P_a \gamma_a (1 - X^{.29})} \cdot X^{.71} \qquad (18)$$

wherein $Q_m$ is the volumetric rate of air flow (cubic feet per second), and $F_m = uF$; $u$ being the coefficient of air flow, and F being the cross-sectional area of passage 2 (in square feet), as determined by the degree of opening of throttle valve 4.

This function of X is of such form as to be a maximum for $$X = (.830)^{3.44} = .528 \qquad (19)$$

i.e., if the atmospheric pressure $P_a$ remains constant, while the manifold pressure $P_m$ is made to assume lower and lower values, the maximum weight flow of air ($W_a$) will occur when $P_m = .528 P_a$, i.e., about 7.766 p.s.i.

Since the power output of the engine is generally proportional to the rate of mass air flow ($W_a$), the flow area ($F_m$) around throttle 4 (when said throttle is in its most restricted operating position), should be of sufficient size that the manifold pressure ($P_m$) does not decrease to a value below .528 $P_a$ (i.e., 7.766 p.s.i.), when the engine is operating at maximum speed and minimum load.

When vehicle speed exceeds the engine power speed (as when going downhill), the manifold pressure ($P_m$) may drop below the critical value of 7.766 p.s.i., but this is of minor importance, since the decreasing rate of mass air flow ($W_a$) with increase in engine speed (N) reduces the power output of the engine, which is not required under such overrunning conditions, and such reduction in power assists in reducing vehicle speed and also reduces fuel consumption. The same considerations also are obtained when the vehicle (and engine) are running at high speed and the throttle 4 is suddenly closed.

In my novel fuel supply system, the fuel feed is not motivated by the rate of air flow to the engine, and hence the cross-sectional area of air passage (2) may be made much larger than is possible in conventional carburetors where the fuel feed is motivated by the air flow. This permits the air to be supplied to the engine at much higher manifold pressures, which correspondingly increases the power output of the engine, since the entering air is denser.

For maximum power output of the engine, the mixture ratio should be about .078; that is, the fuel flow should be 7.8 percent by weight of the air flow. Maximum power output requires operation of the engine under wide open throttle, and when the throttle is wide open (100%), the manifold air pressure ($P_m$) varies only within a relatively narrow range (e.g., between approximately 14.63 p.s.i. at top speed to substantially 14.70 p.s.i. at lowest speed).

For idling operation of the engine (i.e., at approximately 5 percent of its top speed), the manifold pressure ($P_m$) again varies only within about the same narrow range (e.g., from about 14.64 p.s.i. at 10 percent throttle opening, to substantially 14.70 p.s.i. at 100 percent throttle opening).

For operation of the engine throughout its normal range of speed and load, i.e., above idling speed and below maximum speed and power output, the manifold air pressure may vary from substantially 14.70 p.s.i., at low speeds and loads, to about 7.766 p.s.i. at top speed and light load (i.e., with relatively small degrees of throttle opening). Since the power output of the engine is approximately proportional to the rate of mass air flow therethrough, the engine cannot exceed a power speed at which (for a given throttle opening) the manifold pressure falls below 7.766 p.s.i.; since this is the critical pressure which produces the maximum rate of mass air flow. If the manifold pressure falls below 7.766 p.s.i., the rate of mass air flow decreases with decreasing manifold pressure. Accordingly, the only condition under which the manifold pressure can fall below 7.766 p.s.i. is when the vehicle speed exceeds the engine power speed. This may occur when the vehicle is running down hill, with the throttle only partially open; or when the vehicle is moving at high speed, with the throttle near wide open position, and the throttle is suddenly closed to reduce speed. Under such conditions, power is not required from the engine, and any fuel flowing thereto is largely wasted. This is a common defect of present day carburetors, which is largely obviated in my invention by making the air intake passage to the engine manifold of sufficient size to prevent the manifold pressure from dropping below 7.766 p.s.i. until the engine is operating near maximum speed with throttle nearly closed (e.g., 10% open). Such enlargement of the air intake passage through a carburetor is impossible because the air velocity through the passage drops to such low value as to cause failure of the fuel flow, when the engine is operating at low speeds with nearly full open throttle (i.e., under heavy loads).

Figure 10:
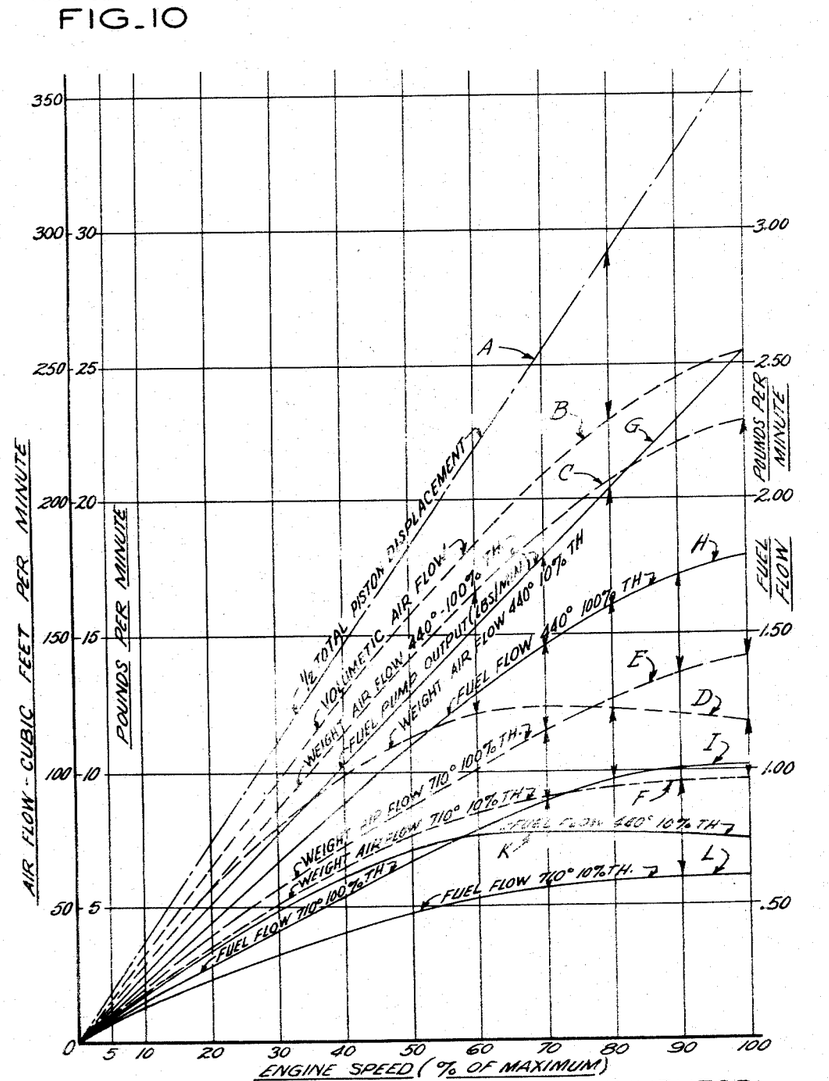
Figure 10 is a graph showing the relation between the air flow, fuel flow to the engine, and by-passed fuel flow, in the embodiments of my improved fuel supply system shown in Figures 5, 6, 7 and 8, under various operating conditions.

Variations of air flow and fuel flow to the engine throughout the engine speed range are shown graphically in Figure 10, wherein the horizontal lines (abscissa) denote engine speed (as percentage of maximum speed) and the vertical lines (ordinates) denote air flow (dash line curves in reference to left hand scale), or fuel flow (full line curves in reference to right hand scale).

The curves in Figure 10 show the following entities:

*Air flow curves*

Curve A = One half total piston displacement, i.e., total air pumping capacity.

Curve B = Volumetric air flow through engine, i.e., ½ total piston displacement times volumetric efficiency of the engine, as an air pump.

Curve C=Weight air flow through engine, when operating with full throttle, and lowest entering air temperature (440° F.).

Curve D=Same as curve C, except engine is operating with minimum throttle opening (10%).

Curve E=Same as curve C, except entering air is at highest temperature (710°).

Curve F=Same as curve D, except entering air is at 710°.

*Fuel flow curves*
*(For mixtures ratio C=10%)*

Curve G=Fuel pump output (p./m.).

Curve H=Fuel flow to engine operating with full open throttle and lowest entering air temperature (440°).

Curve I=Same as curve H, except entering air is at 710°.

Curve K=Same as curve H, except engine is operating with minimum throttle opening (10%).

Curve L=Same as curve K, except entering air is at 710°.

A comparison of curves A and B shows the effect of the volumetric efficiency ($n_v$) of the engine as an air pump in reducing the air flow through the engine. Thus, the ordinates between curves A and B show how the actual (volumetric) air flow through the engine falls below engine air pumping piston displacement, as engine speed increases. These ordinates clearly demonstrate why any fuel supply system, which does not regulate fuel flow to engine in accordance with the variation of volumetric efficiency ($n_v$) with changes in engine speed, is inherently incapable of maintaining any selected, fixed mixture ratio (C) under varying engine speed.

A comparison of curve C with D, shows the effect on weight air flow to the engine of the decrease in manifold air pressure ($P_m$), with increasing engine speed, at the same (minimum) entering air temperature (440°). It is here to be particularly noted that, while the ordinates of curve C increase with increase in engine speed throughout the entire speed range of the engine, the ordinates of curve D reach a maximum at 70% of maximum engine speed and then decrease with further increase in engine speed. This is because the manifold air pressure ($P_m$) reaches its critical value of 7.766 p.s.i. at 70% maximum speed, when the engine is operating with minimum throttle opening (10%), and further increase in engine speed actually reduces the weight air flow to the engine. It is thus obvious that any fuel supply system which does not regulate the fuel flow to the engine in accordance with this criterion will inherently fail to maintain a selected, fixed mixture ratio whenever the manifold pressure ($P_m$) falls below its critical value of 7.766 p.s.i.

A comparison of curve C with E, or curve D with F, shows the effect on weight air flow to the engine of an increase in the temperature ($T_m$) of the entering air, at various engine speeds. It is to be noted that the ordinates between curves C and E, and between curves D and F, increase with increase in engine speed throughout the speed range of the engine, and clearly demonstrate why any fuel supply system which does not regulate the fuel flow to the engine in accordance with changes in the temperature ($T_m$) of the air entering the engine, inherently fails to maintain any selected, fixed mixture ratio, under varying air temperatures. This is a prevailing deficiency of automotive carburetors in use today.

A comparison of curve G with curves H, I, K and L shows how the fuel flow to the engine progressively falls below a fixed, linear ratio with engine speed, as said speed increases. This is due to the effect of volumetric efficiency ($n_v$) on air flow through the engine, as described above, and the effect on the density of the air entering the engine caused by variations in the pressure and temperature of said entering air, as also pointed out above. It is here to be particularly noted that an increase in temperature of the entering air from 440° F., absolute, to 710° F., absolute, causes a reduction of 44.86% in its density at the same pressure (14.70 p.s.i.); while a reduction in manifold pressure, from 14.70 p.s.i. to the critical pressure 7.766 p.s.i., causes a reduction in its density of 47.17% at the same temperature (519° F. abs.). Accordingly, an increase of 270° F. in the temperature of the air entering the engine causes almost as great a reduction in its density, as a decrease of its pressure from 14.70 p.s.i. to its critical pressure 7.766 p.s.i. This clearly shows that regulation of the fuel flow to the engine in accordance with the temperature of the entering air is substantially as important as regulating said fuel flow in accordance with manifold pressure.

Finally, it will be observed that the ordinates between curve G and curves H, I, K and L show the relative amounts of the by-passed fuel flow required to properly regulate the fuel flow to the engine to obtain a selected fixed mixture ratio (here assumed to be 10%).

In my improved fuel supply system, the fuel flow to the engine is automatically regulated to give optimum mixture ratios under the various operating conditions mentioned in columns 17 and 18 above, in the following manner:

Valve 56 which varies the flow area ($A_b$) of main by-pass orifices 59 and 60 is biased toward closed position by the spring tension in bellows 43, and is moved toward open position by the expansion of said bellows which is subject to the differential between pressure ($P_1$) in the bellows and manifold pressure ($P_m$) in chamber 31, acting downwardly. The spring rate of bellows 43 is such that the lift of valve 56 is linearly proportional to ($P_1-P_m$), and since ($P_1$) varies in accordance with the temperature ($T_m$) in the manifold 1, ($P_1-P_m$) varies in accordance with both the pressure ($P_m$) and temperature ($T_m$) therein. The flow area ($A_b$) through orifices 59 and 60 is the difference between the full area of orifices 59 and 60 and the areas of their valves 57 and 58 at points opposite the bottom of said orifices. That is:

$$A_b = .7854(R_o^2 - R_v^2) \quad (20)$$

Where $R_o$ is the radius of each orifice 59 or 60 and $R_v$ is the radius of each valve 57 or 58 at the bottom of its orifice. If each valve 57 or 58 had a straight line taper, then $$R_v = XL \quad (21)$$

where L is the lift of the valve and X is the slope of its tapered surface. Since the full area ($R_o^2$) of each orifice 57 or 58 is a constant, say $K_2$, the metering area ($A_b$) is:

$$A_b = 2[K_2 - .7854(XL)^2] \quad (22)$$

that is to say, the metering area ($A_b$) would vary as the square of the lift (L) of valve 56.

From the Equations 8 and 14 in columns 14 and 15

$$W_f = W_p - W_b \quad (23)$$

and $$W_f/W_b = A_n/A_b \quad (24)$$

hence, at any particular engine (pump) speed, the fuel flow to the engine ($W_f$) varies in inverse proportion with flow area ($A_b$) through orifices 59 and 60, which in turn varies directly with the lift (L) of valve 56. At any given lift (L) of valve 56, the flow area ($A_b$) may be decreased, and thereby increase the fuel flow to the engine ($W_f$), by suitably increasing the diameter of the tapered portions 57 and 58 of valves 59 and 60 at that point, and vice versa. By selecting suitable values of said diameter at various values of (L), the tapered portions 57 and 58 of valves 59 and 60 may be contoured, so as to obtain a desired fuel flow ($W_f$) and mixture ratio (C), for corresponding values of manifold pressure ($P_m$), since the lift (L) of valve 56 varies in direct proportion to ($P_m$), in Figures 5 and 6, and to ($P_a - P_m$) in Figures 7 and 8.

As shown in columns 9 and 10 above, for idling and for maximum speed and power operation of the engine, the mixture ratio (C) should be greater than during normal operation of the engine, in its intermediate speed range between idling and near top speed. Thus, for optimum power output (wide open throttle), the mixture ratio (C) should be substantially constant, with a value of about .078, between 25 and 100 percent air flow, and should increase from .078, at 25 percent air flow to about .080 at 5 percent air flow. For optimum economy (part open throttle), in intermediate range of engine operation, the mixture ratio should vary from about .077 at 5 percent air flow to .0625 at 35 percent air flow; remain substantially constant at about .0625 between 40 and 70 percent air flow.

Since, as shown in column 14 above, the manifold pressure ($P_m$) varies only from about 14.63 p.s.i. to nearly 14.70 p.s.i., during full power (wide open throttle) operation, and also at idling (circa 5%) speed, the diameters of the tapered portions 57 and 58 of valves 59 and 60 are increased, between values of lift (L), corresponding to values of manifold ($P_m$), from 14.63 p.s.i. to nearly 14.70 p.s.i.; thereby increasing the fuel flow to the engine ($W_f$), so as to obtain a mixture ratio (C) of from .078 at ($P_m$=14.63 p.s.i.) to .080 at ($P_m$=nearly 14.70 p.s.i.). Between values of lift (L), corresponding to from ($P_m$=14.63 p.s.i.) to ($P_m$=7.766 p.s.i.) the diameters of valves 59 and 60 vary the fuel flow to the engine ($W_f$), so as to obtain mixture ratios: from .077 at 5 percent air flow, to .0625 at 40 percent air flow; .0625 from 40–70 percent air flow; and from .0625 at 70 percent to .078 at 100 percent air flow. In connection with the foregoing, it is to be understood that the fuel flow through volumetric valve 65, which varies with the volumetric efficiency of the engine (as an air pump), is added to the fuel flow through valves 57 and 58 at all engine speeds.

From the above description of the construction and operation of valves 56, 57 and 65, it is seen that these valves, by regulating the fuel flow to the engine, so as to obtain optimum mixture ratios throughout the entire operating of the engine, perform the functions of the main metering jet, the economizer, and the idling system in present day carburetors; also (as shown in columns 8 and 9 above) the function of the accelerating pump and choke device employed in such carburetors, to facilitate acceleration and starting of the engine.

In the fuel regulator shown in Figure 5, the bellows 43 regulates the fuel flow to the engine ($W_f$) in accordance with both pressure ($P_m$) and temperature ($T_m$) variations of the air passing through the engine intake manifold, since the movement of the bottom wall 45 of the bellows is proportional to the changes in volume of the air in the bellows 45-bulb 51 system caused by changes in its pressure and temperature. Thus, it will be noted that the bellows 45 will be in its most retracted (uppermost) position when the pressure ($P_m$) in chamber 31 (acting upwardly on said bellows) is at its maximum value, and the temperature of the air in bulb 51, bellows 43 (and the communicating passage 50), is at a minimum value. Since the manifold pressure ($P_m$) in chamber 31 attains its maximum value when it equals the outside atmospheric pressure ($P_a$), it is only necessary to select the minimum operating temperature ($T_m$) at which the engine operates, in order to determine the values of ($P_m$) and ($T_m$) at which the volume of air in the bulb 51 and bellows 43 system is a minimum. If it is assumed that the minimum operating temperature of the engine is say 20° F. below zero (=440° abs.), then the volume ($V_c$) of air in bulb 51 and bellows 45 system is a minimum, when ($P_m$) is 14.70 p.s.i. and ($T_m$) is 440° abs. If the pressure ($P_a$) decreases to a value ($P_1$) or ($T_m$) increases, to a value ($T_1$) or both, then the volume of air ($V_1$) and the pressure ($P_1$) in the bulb 51 and bellows 45 system becomes according to the equation:

$$\frac{V_1 P_1}{T_1} = \frac{V_c \times 14.70}{440}$$

where $V_c$ has a selected fixed value.

Since the only space in the bulb 51-bellows 43 system that can increase, is the space in the bellows whose area ($A_{b'}$) is constant, it follows that the increase in volume of the air in said system is equal to the area ($A_{b'}$) of the bellows times its downward travel ($H_1$) caused by the expansion of said air. That is to say:

$$(V_1 - V_c) = (A_{b'} \times H_1)$$

Since the increase in volume ($V_1 - V_c$), due to expansion, is proportional to the decrease in pressure ($P_m$) and increase in temperature ($T_m$), it follows that the downward travel of the bellows (H) is proportional to both the decrease in ($P_m$) and increase in ($T_m$). Hence, the downward movement of valve 56, and corresponding increase in the flow area through orifices 59 and 60, is proportional to the decrease in ($P_m$) and increase in ($T_m$) and vice versa.

The amount of fuel flowing to the engine ($W_f$) depends upon the ratio of the by-passed fuel flow ($W_b$) to the output ($W_p$) of the pump 13, and since the by-passed fuel flow depends upon the flow area through orifices 59 and 60 (assuming valve 65 is closed), it follows that the fuel flow to the engine ($W_f$) will vary in proportion to the decrease in ($P_m$) and increase in ($T_m$) which open valves 59 and 60. At the same time, the density of the air flowing to the engine also varies in proportion to variations in ($P_m$) and ($T_m$), so that the rate of fuel flow to the engine will always be proportional to the rate of air flow (by weight) thereto; that is, to the rate of mass air flow.

From the foregoing, it is clear that if valve 56 is raised to its maximum lift, when air at atmospheric pressure ($P_a$) and a temperature of −20° F. (440° abs.) fills the bulb 51-bellows 43 system, valve 56 will thereafter vary the flow area through orifices 59 and 60 in proportion to any changes in pressure ($P_m$) and/or temperature ($T_m$).

Alternatively, if the bulb 51-bellows 43 system is similarly charged with air at normal atmospheric pressure ($P_a$=14.7 p.s.i.) and temperature (59° F.=519° abs.), it is only necessary to lower valve 56 (during the charging operation) to that percentage of its total drop (caused by temperature alone), as (519°) is a percentage of the maximum temperature at which said drop occurs. If it be assumed that the maximum operating temperature of the engine is say 250° F.(=710° abs.), then the total range of temperature is (710°−440°)=270° F. Since a temperature of 59° F. is 79° above the minimum of 440° abs., at 59° F. the increase in temperature is 29.26% of the total temperature range. Hence, valve 56 should be lowered to a position corresponding to about 29% of its maximum drop caused by increase in temperature alone (i.e., no change in pressure $P_m$). Since charging the bulb 51-bellows 43 system with air at normal temperature (i.e., 59° F.), eliminates the necessity for reducing the temperature of the charging air to −20° F., it is the preferred method of charging said system.

A similar procedure can obviously be used in charging bellows 43 in the modification shown in Figure 6, while the modifications shown in Figures 7 and 8 require no charging with air.

Figure 11:
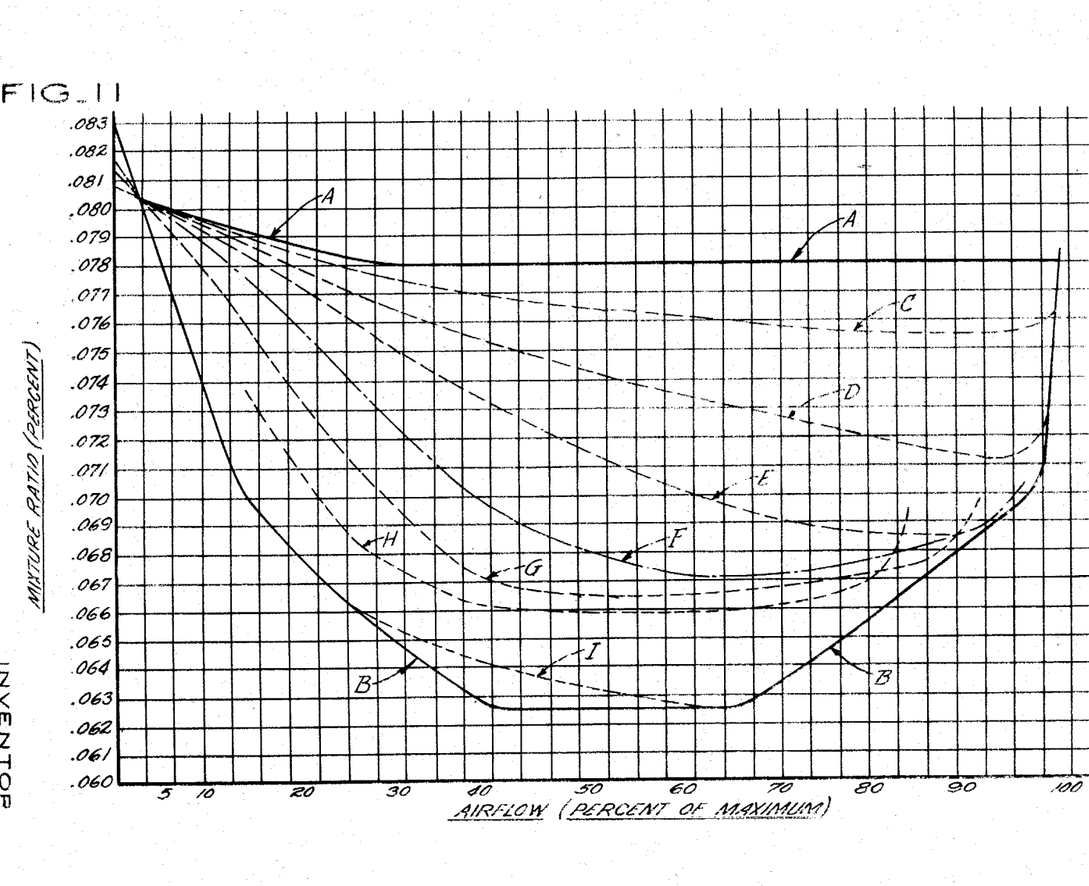
Figure 11 is a graph of typical mixture ratios obtained by the embodiments of my invention shown in Figures 5, 6, 7 and 8.

In Figure 11, which shows graphically typical mixture ratios obtained in the operation of the several embodiments of my invention, the abscessa denote the mass air flows through the engine, at speeds varying from minimum to maximum (as percentages of the maximum air flow), and the ordinates denote values of the mixture ratio (as percentages of fuel to air by weight). The full lines A and B show the mixture ratios at maximum and minimum throttle openings, respectively, while the dotted lines C, D, E, F, G, H, and I, show the mixture ratios at 75%, 50%, 40%, 30%, 20%, 15%, and 10% of maximum throttle opening, respectively. It will be noted (line A) that the mixture ratio is held substantially constant (at 7.8%) at all speeds when the throttle is full open, as required for maximum power output, and the mixture ratio is progressively reduced from (7.8%) to (6.25%) as the throttle opening is reduced from maximum to minimum. Also, the leanest mixture ratios are obtained in the most-used, middle portion of the operating range, and increasingly richer mixtures occur near minimum and maximum speeds, as required for idling and maximum power outputs, respectively.

From the foregoing description of the operation of my improved fuel supply system, it will be appreciated that my invention is based upon the following novel principles of operation:

(1) A positive displacement fuel pump, driven in fixed gear ratio by the engine, has a displacement (per revolution of the engine) which bears a selected, constant ratio to the engine piston displacement (per revolution of the engine), such as to equal the desired fuel/air mixture ratio, when the air entering the engine cylinders is at its maximum density. This insures that the fuel flow to the fuel regulating unit 11 varies in a selected, constant ratio with engine speed, and the action of said regulator is independent of engine speed (Equation 24, page 37), except for the variation of volumetric efficiency ($n_v$) with engine speed (N).

(2) A fuel regulating unit 11 modifies the pump delivery to the engine, in accordance with: (a) the density of the air in air intake manifold 1 (i.e., in accordance with the absolute pressure and temperature of the air); (b) engine volumetric efficiency; and (c) selected values of the fuel/air mixture ratio, for idling and maximum power output operation of the engine (Equation 24, page 37).

(3) Fuel regulating unit 11 modifies the fuel pump delivery to the engine by varying the size of main by-pass, metering orifices 59 and 60, inversely in accordance with a selected function of the air absolute pressure ($P_m$) is manifold 1, and also by varying the size of a supplementary by-pass metering orifice 64 directly in accordance with variations in the volumetric efficiency of the engine (as an air pump) with changes in engine speed. Hence, the percentage of by-passed fuel is such as to make the remainder of the fuel pump output (which flows to the engine) bear the desired mixture ratio to the corresponding air flow to the engine, at any engine speed and load.

(4) The fuel flow to the engine is metered through a fixed jet orifice 78, and the fuel supply tank 16 is connected to manifold 1, so that the pressure of the fuel on the downstream sides of orifices 59 and 60 and 64 is the same (i.e., $p_m$); and the pressure ($P_f$) of the fuel (in chamber 30) on the upstream sides of said orifices is the same; hence, the ratio of the engine fuel flow ($W_f$) to the total by-pass flow ($W_b$) is the same as the ratio of the flow area ($A_n$) through orifice 78 to the combined flow areas ($A_b$ and $A_c$) through orifices 59, 60 and 64. Thus, the fuel flow to the engine is regulated by the flow area ratio $(A_b + A_c)/A_n$ and is independent of pump discharge pressure ($P_f$), and manifold pressure ($p_m$).

(5) By the use of a suitably designed variable displacement fuel pump (Figure 9), in lieu of a constant displacement fuel pump 13, the fuel pump delivery ($W_p$) may be made to vary in the same manner as the volumetric air flow through the engine, in which case, the fuel regulating unit varies the by-pass fuel flow ($W_b$) only for variations in the density of the air entering the engine; thereby reducing the by-pass fuel flow ($W_b$) at all times, which permits the use of a smaller capacity fuel pump.

In addition to the foregoing and the well-known advantages of fuel injection over carburetion, my improved fuel system comprises the following novel features and advantages over the prior art:

(A) The air supply and fuel supply systems are separate and distinct and do not merge until they reach the air intake ports 10 of the engine. Hence, the fuel does not contact the walls of the air intake manifold 1, with resulting improvement in the uniformity of the fuel/air mixture ratio under various operating conditions.

(B) No venturi restriction is required in the air passage; hence, the manifold pressure is at a higher value at all engine speeds. This substantially increases the power output of the engine, especially at wide open throttle, i.e., maximum power operation. This also permits a larger sized air passage to be employed for any particular size of engine, which also increases its power output.

(C) The fuel flow to the engine is not motivated by the air flow thereto, but by the fuel pump which maintains the required positive (superatmospheric) pressure on the fuel supply at all engine speeds. This eliminates the irregularity of fuel flow at low rates of air flow, which is inherent in prior art carburetors, wherein the fuel flow is motivated by the air flow, and obviates the necessity for special additional means for regulating the fuel flow under engine idling operation.

(D) Since the same pump is used to lift the fuel from the supply to the engine and to inject the fuel into the engine ports, no additional pump is required for my novel fuel system.

(E) Since valve 56 is adapted to vary the area of orifices 59 and 60 in such manner as to supply additional fuel whenever the throttle 4 is quickly opened, and vice versa, no additional acceleration device is required in my improved fuel system.

(F) Similarly, since fuel regulating unit 11 is adapted (by use of boss 78) to supply additional fuel upon starting of the engine, no choke valve or other device for this purpose is required in my improved fuel supply system.

While I have shown and described the preferred embodiment of my invention, I desire it to be understood that I do not limit it to the precise details of construction disclosed by way of illustration, as these may be changed and modified by those skilled in the art without departing from the spirit of my invention or exceeding the scope of the appended claims.

I claim:

1. A fuel supply and injection system for an internal combustion engine, including fuel supply control means, comprising: first means, responsive to engine induction air pressure and temperature, for decreasing said fuel supply with decrease of said pressure and with increase of said temperature; and second means, responsive to engine speed, operatively associated and coordinated with said first means, for modifying said fuel supply, in accordance with the air-pumping volumetric efficiency of the engine, at all engine speeds.

2. A fuel supply control means according to claim 1, wherein a part of said first means is responsive to the differential between said induction air pressure and outside atmospheric pressure.

3. A fuel supply and injection system for an internal combustion engine, including fuel supply control means, comprising: first means, responsive to engine induction air pressure, for decreasing said fuel supply with decrease of said air pressure, second means, responsive to engine induction air temperature, for decreasing said fuel supply with increase in said temperature; and third means, responsive to engine speed and operatively associated and coordinated with said first and second means, for modifying said fuel supply, in accordance with the air-pumping volumetric efficiency of the engine, at all engine speeds.

4. A fuel supply and injection system for an internal combustion engine, including fuel supply control means, comprising: first means, responsive to a fuel pressure always equal to engine induction air pressure, for decreasing said fuel supply with decrease of said air pressure; and second means, responsive to engine induction air temperature, for decreasing said fuel supply with increase in said temperature.

5. A fuel supply and injection system for an internal combustion engine, including fuel supply control means, comprising: first means, responsive to a fuel pressure always equal to engine induction air pressure, for decreasing said fuel supply with decrease of said air pressure; and second means, responsive only to the temperature of fuel surrounding said means, for decreasing said fuel supply with increase in said temperature.

6. A fuel supply and injection system for a multicylinder, internal combustion engine, including an engine-drive fuel pump, which lifts fuel from a lower-level supply source to said engine and injects a portion of said fuel into the engine cylinders; and a fuel supply control having means for regulating the fuel injected into the engine, in accordance with engine induction air pressure and temperature.

7. A fuel supply and injection system according to claim 6, wherein said fuel supply control includes means, responsive to engine speed, for modifying the fuel injected by said pump into said engine, in accordance with the air-pumping volumetric efficiency of the engine, at all engine speeds.

8. A fuel supply and injection system according to claim 6, wherein the fuel pump has incorporated means for automatically regulating its fuel output, in accordance with the air-pumping volumetric efficiency of the engine at all engine speeds.

9. A fuel supply and injection system according to claim 6, wherein said control includes means for recirculating around said pump the portion of said pump output in excess of the portion injected into said engine.

10. A fuel supply and injection system according to claim 9, wherein said control includes means for regulating the fuel injected into the engine in accordance with the air-pumping volumetric efficiency of the engine, at all engine speeds.

11. A fuel supply and injection system according to claim 9, wherein said control includes a fixed flow area metering orifice, through which the fuel injected into the engine flows, and at least one variable flow-area bypass orifice, through which the recirculated fuel flows; and means for applying across said orifices the same fuel pressure differential at all times, whereby the injected fuel flow and the recirculated fuel flow are always proportional to the ratio of the flow areas of their respective orifices.

12. A fuel supply and injection system including a fuel control having means, responsive to engine induction air pressure and surrounding atmospheric pressure, for actuating said control means to increase the engine fuel supply upon increase in said induction air pressure relative to said atmospheric pressure; and means, responsive to engine speed, for modifying said engine fuel supply in accordance with the air-pumping volumetric efficiency of the engine, at all engine speeds.

13. A fuel supply and injection system according to claim 12, wherein said fuel control includes means to decrease the engine fuel supply upon increase in engine induction air temperature.

14. A fuel supply and injection system according to claim 12, wherein said fuel control includes means to decrease the engine fuel supply upon increase in the temperature of said fuel.

15. A fuel supply and injection system for an internal combustion engine, comprising: a constant displacement fuel pump, driven by said engine in constant speed ratio therewith, and whose output per engine revolution bears a fixed ratio to the maximum volumetric air-pumping displacement, per engine revolution; and an engine fuel supply control having means for regulating a portion of fuel output of said pump that is delivered to said engine, in accordance with engine induction air pressure and temperature; and means for recirculating around said pump the remainder of said pump output that is in excess of the fuel delivered to said engine.

16. In a system for supplying and injecting fuel into the cylinders of an internal combustion engine, a fuel supply and injection pump, a conduit connecting said pump to said cylinders, a fixed flow-area metering orifice in said conduit, and means for regulating the supply of fuel to said engine by automatically varying the pressure drop across said orifice, in accordance with engine induction air pressure and temperature.

17. A fuel supply and injection system according to claim 16, having additional means, responsive to engine speed, for regulating the fuel supply to said engine by automatically varying the pressure drop across said orifice, in accordance with the air-pumping volumetric efficiency of said engine, at all engine speeds.

18. A fuel supply system for a piston-type, internal combustion engine having a combustion air supply thereto, comprising: a fuel supply pump whose output rate bears a preselected, constant, linear ratio to the air-pumping, volumetric displacement of the engine pistons, at all engine speed, means for dividing said pump output into a plurality of components, one of which is varied with the density of the air entering said engine, and the other component is recirculated around said pump, and means for delivering said first component to said engine, whereby the rate of fuel supply to said engine is not motivated by but varies directly, in a predetermined proportion, with the mass air flow therethrough.

19. A fuel supply system according to claim 18, wherein said pump output dividing means comprising means for recirculating around said pump that component of said pump output which is not delivered to said engine.

20. A fuel supply system according to claim 19, wherein said recirculating means includes a metering orifice whose flow area is varied inversely, in accordance with the pressure of the air entering the cylinders of said engine, whereby the flow of said recirculated component is varied inversely with said pressure and the fuel flow to the engine is varied directly with said pressure.

21. A fuel supply system according to claim 19, wherein said recirculating means includes a metering orifice whose flow area is varied directly, in accordance with the temperature of the air entering the cylinders of said engine, whereby the flow of said recirculated component is varied directly with said temperature and the fuel flow to the engine is varied, inversely with said temperature.

22. A fuel supply system according to claim 19, wherein said recirculating means comprises means for regulating the flow of said recirculated component, in accordance with the pressure and temperature of the air entering the cylinders of said engine, whereby the flow of fuel to said engine is varied in accordance with the density of said air.

23. A fuel supply system in accordance with claim 22, wherein said recirculating means comprises means for also regulating the flow of said recirculated component in accordance with the air-pumping, volumetric efficiency of said engine, whereby the rate of fuel flow to said engine is varied in direct, linear proportion to the rate of mass air flow therethrough.

24. A fuel supply system in accordance with claim 23, wherein said recirculating means includes a contoured valve whose contour is such that said regulated flow of said recirculated component is modified in accordance with preselected fuel/air mixture ratios, so that a selected optimum value of said mixture ratio is automatically obtained under varying engine speeds and loads.

25. A fuel supply system for an internal combustion engine having a combustion air supply thereto, comprising: a rotary fuel supply pump whose output per revolution bears a constant ratio to the total piston displacement per revolution of said engine; first means, connected in series between said pump and engine for regulating the flow of a portion of said pump output in accordance with the volumetric efficiency of the engine at all engine speeds; and second means for delivering said portion to said engine, whereby the rate of fuel supply to said engine varies directly, in constant proportion with said volumetric efficiency, at all engine speeds.

26. A fuel supply system according to claim 25, wherein said first means includes means for modifying said portion of said pump output in accordance with the density of the air flowing to said engine, whereby the rate of fuel supply to said engine varies directly, in linear proportion with the rate of mass air flow therethrough.

27. A fuel supply system according to claim 25, wherein said first means includes means for automatically further modifying said portion of said pump output in accordance with a preselected fuel/air mixture ratio, whereby a selected, optimum value of said mixture ratio is automatically obtained, under varying engine speeds and loads.

28. A fuel supply system according to claim 25, wherein said first means includes means for dividing said pump output into a plurality of components, one of which is said regulated portion which is delivered to the engine, and the other is recirculated around said pump.

29. For a piston-type internal combustion engine having a combustion air passage and a throttle therein, a fuel supply system, separate from said air passage, comprising: a fuel supply pump whose output rate bears a preselected constant ratio to the volumetric rate of air flow through said engine at all engine speeds, first means, connected in series between said pump and engine; for modifying the rate of flow of a portion of said pump output, in proportion to the density of the air entering said engine; and second means for delivering said portion at said modified rate to said engine, whereby the rate of fuel supply to said engine varies directly, in a predetermined proportion, with the rate of mass air flow therethrough, in all positions of said throttle.

30. A fuel supply system according to claim 29, having means whereby the fuel flow to said engine, during idling operation of said engine, is supplied under a superatmospheric pressure which is independent of the air pressure in said air passage.

31. A fuel supply system for a piston-type, internal combustion engine having an air intake passage, comprising: a fuel supply pump whose output rate bears a preselected ratio to the total air-pumping piston displacement of said engine, modified by its volumetric efficiency; means for delivering to said engine a portion of said pump output which varies in linear proportion to the density of the air entering said engine from said passage, and recirculating around said pump the remainder of said pump output; whereby the rate of fuel supply to said engine varies directly, in preselected proportion, with the rate of mass air flow to said engine.

32. A fuel supply system according to claim 31, wherein said fuel delivery means includes means responsive to the pressure and temperature of the air in said passage.

33. A fuel supply system according to claim 18, wherein said means includes a valve for regulating the rate of flow of said portion of said pump output delivered to said engine, in accordance with the density of air in said passage.

34. A fuel supply system according to claim 33, wherein said fuel delivery means also includes means for recirculating around said pump that portion of said pump output that is not delivered to the engine, and said valve regulates the rate of flow of said recirculated portion.

35. A fuel supply system for a piston-type, internal combustion engine having a combustion air supply thereto, comprising: a fuel supply pump whose output rate bears a preselected, constant, linear ratio to the air-pumping volumetric displacement of the engine pistons at all engine speeds, means for dividing said pump output into a plurality of components, of which the first is varied with the density of the air entering said engine and the second is recirculated around said pump; and means for delivering said first component to said engine; said dividing means comprising means for recirculating said second component around said pump; said recirculating means comprising first metering orifice whose flow area is varied inversely, in accordance with the pressure of the air entering the cylinders of said engine, whereby the flow of a portion of said recirculated component is varied inversely with said pressure; and a second metering orifice whose flow area is varied directly, in accordance with the temperature of said air, whereby the remainder of said recirculated component is varied directly with said temperature; whereby the fuel flow to the engine is varied directly with the density of said air and the rate of mass air flow through said engine.

36. A fuel supply system for an internal combustion engine having a combustion air supply thereto, comprising: a fuel supply pump whose output rate bears a preselected ratio to the volumetric rate of air flow through said engine; first means, connected in series between said pump and engine, for modifying said pump output rate in proportion to the density of the air entering said engine; and second means for delivering said fuel at said modified rate to said engine; said first means including means for dividing said pump output into a plurality of components, one of which is delivered to the engine and the other is recirculated around said pump; said pump output dividing means including a metering orifice of fixed flow area for metering the component delivered to the engine, and a plurality of variable-area metering orifices for metering said recirculated component; means for varying the flow area of one of said variable-area orifices in accordance with the temperature of the air entering the engine; and means for varying the flow area of the other of said variable-area orifices in accordance with the temperature of said air; whereby the flow of said recirculated component is varied in accordance with the density of said air, and the rate of fuel supply to said engine varies directly in a preselected proportion, with the rate of mass air flow therethrough.

37. A fuel supply system according to claim 25, wherein the fuel pressure on the upstream side of all of said orifices is the same, and the fuel pressure on the downstream side of all of said orifices is the same, so that the pressure drop across all said orifices is the same, and the flow through each orifice is proportional to its respective flow area, irrespective of variations in said pressures.

38. For a piston-type internal combustion engine having a combustion air passage and a throttle therein, a fuel supply system, separate from said air passage, comprising: a fuel supply pump whose output rate bears a preselected ratio to the volumetric rate of air flow through said engine, first means, connected in series between said pump and engine, for modifying the rate of flow of a portion of said pump output, in proportion to the density of the air entering said engine; and second means for delivering said portion at said modified rate to said engine; said first means automatically supplying additional fuel to said engine when said throttle is quickly opened, and reducing the fuel supply to said engine when said throttle is quickly moved toward closed position; whereby the rate of fuel supply to said engine varies directly, in a predetermined proportion, with the rate of mass air flow therethrough, in all positions of said throttle.

39. A fuel supply system according to claim 38, wherein said first means is adapted to automatically supply additional fuel to said engine when said engine is started, whereby to facilitate said starting.

40. A fuel supply system according to claim 38, wherein said first means includes means to cut off the fuel supply to said engine when the pressure differential which causes the air flow to said engine falls below its critical value.

41. A fuel supply system for an internal combustion engine having an air intake passage, comprising: a fuel supply pump whose output rate bears a constant ratio to the volumetric rate of air flow through said passage at all engine speeds; means for delivering to said engine a portion of said pump output which varies in linear proportion to the density of the air entering said engine from said passage; said means including means responsive to the air pressure in said passage, and to the temperature of said fuel supply to said engine.

42. A fuel supply system according to claim 41, wherein said fuel delivering means includes a valve for regulating the rate of flow of said portion, in accordance with the density of air in said passage, and a fixed area fuel metering orifice; said valve varying the metering head across said orifice, so that the fuel flow therethrough varies in said linear proportion.

43. A fuel supply system for a piston-type, internal combustion engine having a combustion air supply thereto, comprising: a rotary fuel supply pump whose output rate per revolution bears a preselecter, constant linear ratio to the air-pumping displacement per revolution of the engine pistons; means for modifying said pump output in accordance with the air-pumping volumetric efficiency of said engine; and means for delivering said modified pump output to said engine, whereby the rate of fuel supply to said engine varies directly, in linear proportion with said volumetric efficiency, at all engine speeds.

44. A fuel supply and injection system for an internal combustion engine comprising: means for supplying and injecting fuel into said engine, and fuel supply control means, having means, responsive to engine induction air pressure and temperature, for regulating said fuel supply in accordance with said pressure and temperature; said regulating means having first means sensitive to said pressure and insensitive to said temperature, and second means sensitive to said temperature and insensitive to said pressure, for actuating said regulating means; said first means including a pressure-transmitting liquid having a substantially zero coefficient of thermal expansion, and said second means being actuated by a substantially incompressible liquid having a high coefficient of thermal expansion.

45. A fuel supply and injection system for an internal combustion engine comprising: means for supplying and injecting fuel into said engine, and fuel supply control means, having means, responsive to engine induction air pressure and temperature, for regulating said fuel supply in accordance with said pressure and temperature; said regulating means having first means sensitive to said pressure and insensitive to said temperature, and second means sensitive to said temperature and insensitive to said pressure, for actuating said regulating means; said second means being actuated by an expansible fluid, having a high coefficient of thermal expansion and contained in a rigid-wall container that readily transmits heat from the surrounding induction air, but prevents transmission of said induction air pressure to said fluid.

References Cited in the file of this patent
UNITED STATES PATENTS

| | | |
|---|---|---|
| 2,129,613 | Wunsch et al. | Sept. 6, 1938 |
| 2,136,959 | Winfield | Nov. 15, 1938 |
| 2,146,184 | High | Feb. 7, 1939 |
| 2,165,447 | Browne | July 11, 1939 |
| 2,260,688 | L'Orange | Oct. 28, 1941 |
| 2,673,556 | Reggio | Mar. 30, 1954 |
| 2,706,976 | Gianini | Apr. 26, 1955 |

OTHER REFERENCES

Ser. No. 235,881, L'Orange (A.P.C.), published June 1, 1943.